(12) United States Patent
Annadata et al.

(10) Patent No.: US 12,120,072 B2
(45) Date of Patent: Oct. 15, 2024

(54) SYSTEMS AND METHODS FOR MULTI-CHANNEL MESSAGING AND COMMUNICATION

(71) Applicant: CodeObjects Inc., Milpitas, CA (US)

(72) Inventors: Anil K. Annadata, Saratoga, CA (US); Arun Balasubramanyam, Fremont, CA (US); Sanjin Tulac, Mountain View, CA (US)

(73) Assignee: CodeObjects Inc., Milpitas, CA (US)

( * ) Notice: Subject to any disclaimer, the term of this patent is extended or adjusted under 35 U.S.C. 154(b) by 0 days.

(21) Appl. No.: 18/089,842

(22) Filed: Dec. 28, 2022

(65) Prior Publication Data

US 2023/0164096 A1    May 25, 2023

Related U.S. Application Data

(63) Continuation of application No. 17/179,303, filed on Feb. 18, 2021, now abandoned, which is a continuation of application No. 16/412,332, filed on May 14, 2019, now Pat. No. 10,958,600.

(60) Provisional application No. 62/675,071, filed on May 22, 2018, provisional application No. 62/673,508, filed on May 18, 2018.

(51) Int. Cl.
   *H04L 51/02* (2022.01)
   *H04L 51/04* (2022.01)

(52) U.S. Cl.
   CPC .............. *H04L 51/02* (2013.01); *H04L 51/04* (2013.01)

(58) Field of Classification Search
   CPC .......... H04L 51/02; H04L 51/04; H04L 51/56
   See application file for complete search history.

(56) References Cited

U.S. PATENT DOCUMENTS

| | | | | |
|---|---|---|---|---|
| 2012/0041903 | A1* | 2/2012 | Beilby | .................... H04L 51/02 706/11 |
| 2018/0219806 | A1* | 8/2018 | Girishankar | ...... H04M 1/72436 |

* cited by examiner

*Primary Examiner* — Soe Hlaing
(74) *Attorney, Agent, or Firm* — Bochner PLLC; Andrew D. Bochner

(57) ABSTRACT

A method is provided for operating a multi-channel messaging system. The method may provide automated conversation across multiple communication channels associated with a user by: selecting a first communication channel from the multiple communication channels, wherein the first communication channel is hosted by a first communication server; receiving, via an existing user interface of the first communication channel, a first user input via as part of a conversation with a chatbot, wherein the chatbot comprises a communication data structure comprising a plurality of communication paths; selecting a communication path based on the first user input; and generating a first feedback in response to the first user input according to the selected communication path.

15 Claims, 28 Drawing Sheets

SYSTEMS AND METHODS FOR MULTI-CHANNEL MESSAGING AND COMMUNICATION

CROSS-REFERENCE TO RELATED APPLICATION

This application is a continuation application of U.S. application Ser. No. 17/179,303, filed on Feb. 18, 2021, which application claims priority to U.S. application Ser. No. 16/412,332, filed on May 14, 2019, which application claims priority to U.S. Provisional Applications No. 62/673,508, filed on May 18, 2018, and 62/675,071, filed on May 22, 2018, the contents of which each application is incorporated herein by reference in their entirety.

BACKGROUND

A user may establish communications with a service provider via communication channels to seek for information. Digital assistant such as chatbots can conduct such communications through voice or text. Computer programs for the chatbots can simulate how a human would behave as a communication partner. Chatbots can be used for various practical purposes, including, but not limited to, customer service, sales, marketing, and information acquisition. Chatbots are becoming increasingly popular among different enterprises and companies.

In general, virtual assistant is hosted or operated through a single channel or platform, which limits user experience. Users may have to access a virtual assistant through a proprietary application, software or website. For instance, a chatbot may be operated through a company's website and accessible by a customer through his/her desktop computer. In this situation, the customer may be required to remain at this workstation for a long period of time in order to finish a communication with the chatbot. If something interrupts the communication (e.g., desktop system crashes, the customer needs to pause the communication for other reasons), the customer would expect that the communication can be paused but recorded so that it can be continued at a later time. If the communication is not stored, the customer would have to begin from the beginning to complete their communication. This scenario may be time-consuming and inconvenient, and adversely affect the customer experience.

SUMMARY

Recognized herein is a need for methods and systems for providing a multi-channel messaging system. The messaging system may comprise providing a digital assistant through multiple channels. The digital assistant may be interactive such as chatbots. "Chatbot" used herein can represent an example of artificial intelligence driven communications. Chatbot may also be referred to as talkbot, chatterbot, bot, IM bot, interactive agent, digital assistant or artificial conversational entity.

Provided are methods and systems for operating chatbots across multiple channels. In an aspect, a method of operating chatbots across multiple channels comprises (1) selecting one or more channels, wherein the one or more channels host one or more chatbots, wherein at least one chatbot of the one or more chatbots has a communication data structure comprising a plurality of communication paths, wherein each communication path comprises a plurality of units; (2) receiving an input from a user through one of the one or more channels; (3) comparing the input with the plurality of units in the communication data structure; (4) selecting a unit in the communication data structure based on the comparison in (3); (5) processing the unit to generate instructions coded in the unit; (6) selecting a communication path based on the instructions in (5); and (7) providing a feedback to the user based on the communication path selected in (6).

In another aspect, a method of operating chatbots across multiple channels comprises (1) selecting one or more channels, wherein the one or more channels host one or more chatbots, wherein at least one of the one or more chatbots has a communication data structure comprising a plurality of communication paths, wherein each communication path comprises a plurality of units; (2) receiving one or more inputs from a user through the one or more channels; (3) producing a communication identity of the user based on the one or more inputs from the user; (4) selecting a unit in the communication data structure based on the communication identity; (5) processing the unit to generate instructions coded in the unit; (6) selecting a communication path based on the instructions in (5); and (7) providing a feedback to the user based on a communication path selected in (6).

In some embodiments, processing the unit to generate instructions comprises receiving one or more inputs from a user, checking one or more units in the communication data structure, determining whether the input matches one unit in the communication data structure, selecting a communication path if there is a match between the input and one unit in the communication data structure, determining whether a communication identity obtained based on user's inputs matches one communication identity of a particular user stored in the communication database, selecting a communication path if there is a match between a communication identity obtained based on user's inputs and one communication identity of a particular user stored in the communication database, randomly selecting a unit/communication path according to a selection algorithm if no match is found, and providing a feedback to the user based on the selected communication path.

In another aspect, a method of building a multi-channel chatbot comprises (1) receiving one or more training datasets; (2) building a communication data structure according to the one or more training datasets, wherein the communication data structure comprises a plurality of communication paths, wherein each communication path comprises a plurality of units.

In another aspect, a unit may perform the following actions: receiving one or more inputs from a user, checking one or more units in the communication data structure, determine whether the input matches one unit in the communication data structure, selecting a communication path if there is a match between the input and one unit in the communication data structure, determining whether a communication identity obtained based on user's inputs matches one communication identity of a particular user stored in the communication database, selecting a communication path if there is a match between a communication identity obtained based on user's inputs and one communication identity of a particular user stored in the communication database, randomly selecting a unit/communication path according to a selection algorithm if no match is found, and providing a feedback to the user based on the selected communication path.

In some embodiments, the methods and systems provided herein can be used by insurance companies. In this situation, the user may be a primary named insured of an insurance policy. In some embodiments, the user's input may include, but not limited to, whether the user is the primary named insured, first name and last name of the user/primary named insured, birthday of the user/primary named insured, social security number of the user/primary named insured, description of a loss, risk address of the loss, risk zip code of the loss, home address of the user/primary named insured, zip code of the user/primary named insured, payment information of the user/primary named insured, and a policy number of the user/primary named insured. In some embodiments, the feedback may include, but not limited to, an answer to a question asked by the user/primary named insured, a question to the user/primary named insured, and an instruction to the user/primary named insured.

In one aspect of the present disclosure, a method for providing automated conversation across multiple communication channels associated with a user is provided. The method comprises: selecting a first communication channel from the multiple communication channels, wherein the first communication channel is hosted by a first communication server; receiving, via an existing user interface of the first communication channel, a first user input via as part of a conversation with a chatbot, wherein the chatbot comprises a communication data structure comprising a plurality of communication paths; selecting a communication path based on the first user input; and generating a first feedback in response to the first user input according to the selected communication path.

In some embodiments, each of the multiple communication channels hosts one or more chatbots. In some cases, the one or more chatbots are accessed via an existing user interface of the respective communication channel. In some embodiments, the multiple communication channels facilitate communications to or from a first subset of communications servers of a plurality of communications servers, and communications to or from a second subset of communications servers of the plurality of communications servers, wherein the first subset is different than the second subset. In some cases, at least some of the plurality of communications servers transmit and receive communications of different types. In some cases, at least one of the plurality of communications servers transmits and receives instant messaging communications, and at least one of the plurality of communications servers transmits and receives text message communications.

In some embodiments, the method may further comprise receiving, via an existing user interface of a second communication channel, a second user input as part of the same conversation with the chatbot. In some cases, the existing user interface of the first communication channel is different from the existing user interface of the second communication channel. In some cases, the method may further comprise generating a second feedback in response to the second user input according to the selected communication path. In some cases, the selected communication path is retrieved from a database configured to store the plurality of communication paths. In some embodiments, each of the plurality of communication paths comprises a plurality of units that at least one of the plurality of units is coded with instructions to navigate the conversation among different communication paths. In some cases, selecting the communication path comprises: comparing the first user input with the plurality of units in the communication data structure to determine a match; and selecting a unit in the communication data structure based on the match.

In another aspect, a system for providing automated conversation across multiple channels associated with a user is provided. The system may comprise: one or more computer processors; and a memory having stored therein machine executable instructions, that when executed by the one or more processors, cause the system to: select a first communication channel from the multiple communication channels, wherein the first communication channel is hosted by a first communication server; receive, via an existing user interface of the first communication channel, a first user input as part of a conversation with a chatbot, wherein the chatbot comprises a communication data structure comprising a plurality of communication paths; select a communication path based on the first user input; and generate a first feedback in response to the first user input according to the selected communication path.

In some embodiments, each of the multiple communication channels hosts one or more chatbots. In some cases, the one or more chatbots are accessed via an existing user interface of the respective communication channel. In some embodiments, the multiple communication channels facilitate communications to or from a first subset of communications servers of a plurality of communications servers, and communications to or from a second subset of communications servers of the plurality of communications servers, and the first subset is different than the second subset. For example, at least some of the plurality of communications servers transmit and receive communications of different types. In other examples, at least one of the plurality of communications servers transmits and receives instant messaging communications, and at least one of the plurality of communications servers transmits and receives text message communications.

In some embodiments, the system is caused to further receive, via an existing user interface of a second communication channel, a second user input as part of the same conversation with the chatbot. In some cases, the existing user interface of the first communication channel is different from the existing user interface of the second communication channel.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
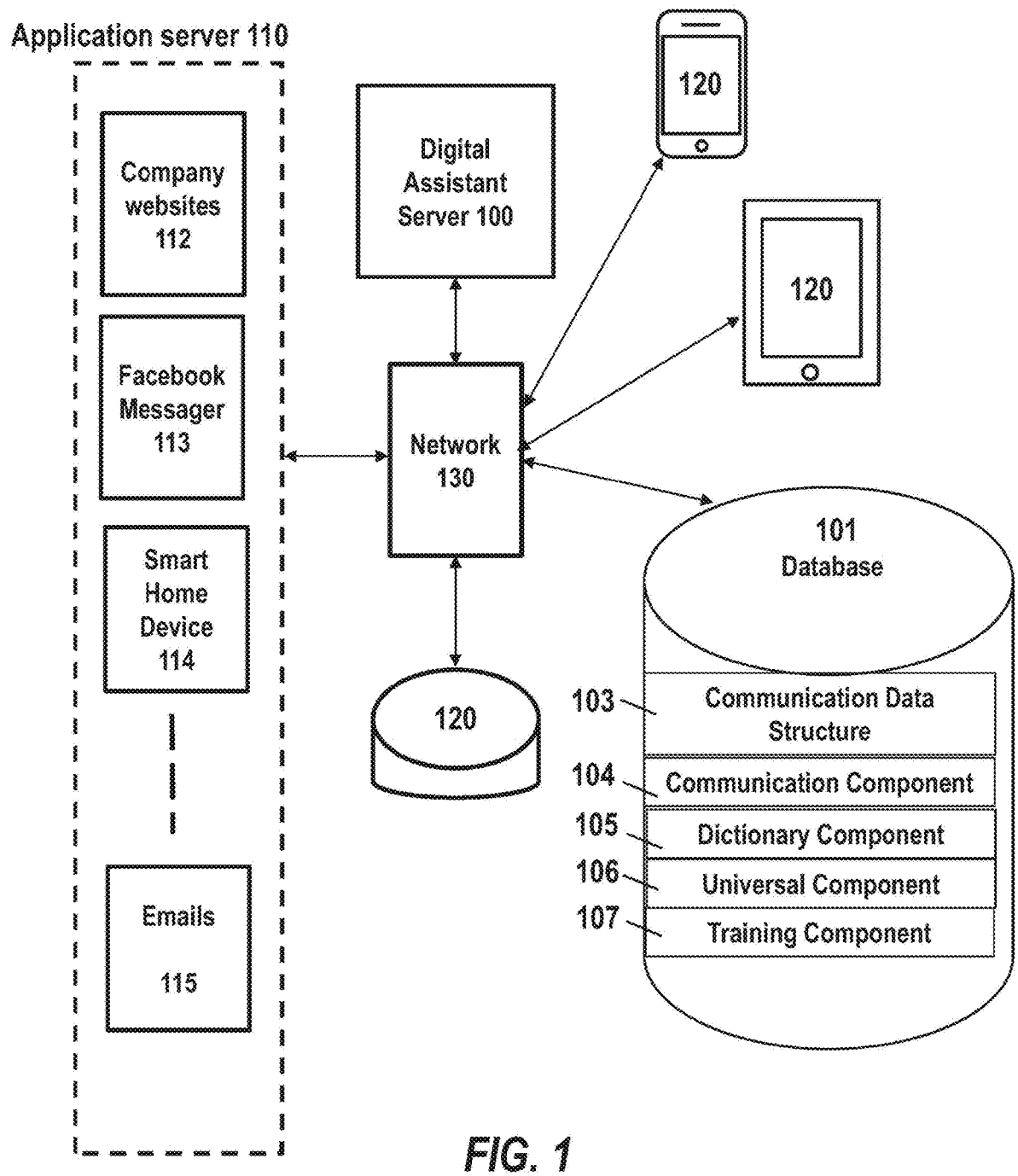
FIG. 1 shows an example of a block diagram of a multi-channel messaging system disclosed herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Provided herein are methods and systems for providing a multi-channel messaging system. The multi-channel messaging system may comprise providing a digital assistant through multiple communication channels. The digital assistant may be a virtual assistant such as a chatbot. The method and system of the presenting disclosure may allow a user to have a conversation with a chatbot via existing communication channels. The user may interact with the chatbot in a same manner as the user establishing a communication using the respective communication channel. This beneficially provides a smooth experience to users. The multiple channels may be communicating with the user using different communications protocols, rules, formats, communication interfaces or user interfaces. For example, one channel may be communicating using a text messaging protocol (e.g. SMS), one channel may be communicating using electronic mail (email) over a mobile phone network, and one channel may be communicating using an instant messaging services proprietary communications protocol over a wireless internet network (e.g. Wi-Fi). The provided systems can support multiple channels and can be integrated with any existing industrial or enterprise systems (e.g., insurance, bank, social media, etc).

A method of operating chatbots through multiple communication channels may comprise selecting one or more communication channels. The one or more communication channels may include, but not limited to, a website channel, email channel, text message channel, digital virtual assistant, smart home device such as Alexa®, interactive voice response (IVR) systems, social media channel and messenger APIs (application programming interfaces) such as Facebook channel, Twilio SMS channel, Skype channel, Slack channel, WeChat channel, Telegram channel, Viber channel, Line channel, Microsoft Team channel, Cisco Spark channel, and Amazon Chime channel, and various others.

The virtual assistant may be a chatbot. The chatbot may be accessed through a social media ID/profile, an email address, a number, or other contact based on the related communication channel. The website channel may enable a chatbot to interact with a user through a website. The website may be a personal website. The website may be an enterprise/company website. The chatbot may be implemented by way of an existing communication channel. A user may be in communication with the chatbot without a need of a change in existing communication channel. For example, when a user is on a given social media channel (e.g., Facebook), the user may access the chatbot that has a social media profile, via an existing messenger API (e.g., Facebook messenger). The email channel may allow the chatbot to interact with the user through the existing user interface i.e., emails. The email may involve a sender and at least one recipient. The user may be a sender or a recipient. The chatbot may be a sender or a recipient. The email may include the information regarding, but not limited to, a name (or display name) of the sender, an address (e.g., email address) of the sender which can also be a return path address, a name (or display name) of the intended recipient, an address (e.g., email address) of the recipient, a subject (or title) of the email, the content of the email (e.g., including a message and/or attachments), and/or a combination of the above. The text message channel may allow the chatbot to interact with the user through the existing user interface i.e., text messages. The text message may involve a sender and at least one recipient. The user may be a sender or a recipient. The chatbot may be a sender or a recipient. The text messages may comprise alphabetic and numeric characters. The text messages may be sent between two or more users of mobile phones, tablets, desktops/laptops, or other devices. The text messages may be sent over a cellular network. The text messages may be sent via an internet connection.

A user may interact with a chatbot via social media channels and messenger APIs. The Facebook channel may enable the chatbot to interact with the user through Facebook Messenger. The Facebook Messenger may provide free voice and text communication. The Twilio SMS may allow the chatbot to interact with the user via text messages or voice applications. The Skype channel may allow the chatbot to interact with the user through a Skype app. The Skype app may allow the chatbot to interact with the user through a video chat, voice call, text, and/or images. The Slack channel may allow the chatbot to interact with the user through a Slack app by real-time messages. The WeChat channel may allow the chatbot to interact with the user through a WeChat app by free messages and calls across countries. The Telegram channel may allow the chatbot to interact with the user through a Telegram app by instant messages. The Viber channel may allow the chatbot to interact with the user through a Viber app by instant messages. The Line channel may allow the chatbot to interact with the user through a Line app by messages and/or voice calls worldwide. The Microsoft Team channel may allow the user to connect with the chatbot using the user's Microsoft Team account. The Cisco Spark channel may allow the chatbot to interact with the user through the Cisco Spark app. The Cisco Spark app may enable group chats and calls, screen-sharing, file-sharing, video meetings, and/or whiteboarding. The Amazon Chime channel may allow the chatbot to interact with the user through the Amazon Chime app. All of the abovementioned apps may be accessible by the user on mobile systems and/or desktop systems. The mobile systems may comprise, but not limited to, iOS, Android, Windows Phone, and Ubuntu Touch. The desktop systems may comprise, but not limited to, Windows, macOS, and Linux.

A chatbot can also be accessed via any suitable conversational channels such as smart home device, voice assistance, home automation system, interactive voice response (IVR) systems and the like. For instance, a chatbot may be activated using a wake-word.

To select the one or more channels, the user may need to perform one or more actions. The one or more actions may include opening one or more channels. The user's action may be opening a website, email, text message, Facebook Messenger, Twilio app, Skype app, Slack app, WeChat app, Telegram app, Viber app, Line app, Microsoft Team app, Cisco Spark app, Amazon Chime app, providing a voice command, push a button and the like. If the user's action is opening one or more channels, the one or more channels opened by the user may be selected for the chatbot communication. For instance, if the user's action is opening a website, the website channel may be selected for the user to interact with the chatbot. The one or more actions may include closing one or more channels. The user's action may be closing a website, email, text message, Facebook Messenger, Twilio app, Skype app, Slack app, WeChat app, Telegram app, Viber app, Line app, Microsoft Team app, Cisco Spark app, and Amazon Chime app. If the user's action is closing one or more channels, the one or more channels closed by the user may not be selected for the chatbot communication. For instance, if the user's action is closing a website, the website channel may not be selected for the user to interact with the chatbot. After closing one or more channels, the user may select another channel by his/her action of opening that channel.

The one or more channels may host one or more chatbots. The one or more channels may host one or more chatbots simultaneously. If the one or more channels host one or more chatbots simultaneously, the communication between the user and chatbots may be stored in a communication database. In this situation, when the user closes one of the one or more channels, the user may continue his/her communication with the chatbot in the channels that remain open. The one or more channels may host one or more chatbots non-simultaneously. If the one or more channels host one or more chatbots non-simultaneously, the communication between the user and chatbots may be stored in a communication database constantly. In this situation, when the user closes a first channel, the communication between the user and the chatbot on the closed channel may be transitioned to a second channel so that the user can continue his/her communication with the chatbot when he/she opens the second channel. For instance, a conversation can be continued and carried over multiple different communication channels, different user interfaces, different types of communications or different servers. Each of the one or more channels may host at least one, two, three, four or more chatbots. This beneficially allows a conversation with a chatbot to be continued on different channels seamlessly using the existing user interfaces.

At least one chatbot of the one or more chatbots may have a communication data structure. The communication data structure may control the direction, the content, the time of a communication between the user and the chatbot. The communication data structure may comprise a plurality of communication paths. The plurality of communication paths may navigate the communication between the user and the chatbot through a plurality of units. Different communication paths may enable the user to go through different communications with the chatbot. In each communication path, a plurality of actions may be performed. The plurality of actions may include, but not limited to, comparing the user's input with a plurality of units, selecting one unit based on the comparison between the user's input and the plurality of units, randomly selecting a unit based on a selection algorithm, providing feedback to the user, and waiting for further input from the user. The plurality of actions may be repeated many times before a communication path is exhausted. The communication path may be unidirectional. The communication path may not be unidirectional. If the communication path is not unidirectional, the communication path may be a loop. In some cases, the communication path may remain open while the conversation is transitioned across multiple channels.

The communication path may comprise a plurality of units. The plurality of units may be coded with instructions to navigate among different communication paths. The plurality of units may comprise different types of units, including, but not limited to, a feedback unit, input unit, wait unit, communication identity analysis unit, and universal unit. The feedback unit may be decoded to provide a feedback to a user during a communication. The feedback may be in a form of text, HTML, image, video, audio, and avatar animation. The input unit may be a reference input unit or a variation thereof. The reference input may represent what a user may input to the chatbot during a communication. The reference inputs may be pre-defined intents, utterances, questions, answers, requests, information, or demands. The reference inputs may be updated constantly according to one or more algorithms. The one or more algorithms may be machine learning algorithms. The reference inputs may be obtained through machine learning using existing customer data. The existing customer data may be historical voice call logs or chat messages. The reference inputs may be obtained through continued learning during a live communication between the user and the chatbot. The reference inputs may be obtained through collecting customer feedback to measure relevance, accuracy, and precision of responses. The input unit may be the user's actual input during his/her communication with the chatbot. The wait unit may be decoded to stop and wait for the user to enter another input. The communication identity analysis unit may be decoded to produce a communication identity of the user based on one or more inputs from the user and select a unit in the communication data structure based on the communication identity. The universal unit may be decoded to match any input during a communication when a match between the user's input and a reference input is not found.

The method of operating chatbots through multiple channels may further comprise receiving an input from a user through one of the one or more channels. The input may be in the form of, but not limited to, text, voice, image, and video. The input may be any type of information of the user, including, but not limited to, the first name of the user, the last name of the user, the birthday of the user, the phone number of the user, the email address of the user, the social security number of the user, the driver's license number of the user, the password of the user, the credit card information of the user, the address of the user, the zip code of the user, and the answers to security questions of the user. The input may be a request, a question, an answer, a demand, or an instruction from the user.

The method of operating chatbots through multiple channels may also comprise comparing the input with the plurality of units in the communication data structure. The comparison between the input and the plurality of the units may comprise checking the received input with the plurality of units until a match is found. The comparison between the input and the plurality of the units may comprise translating the received input into a format using one or more dictionaries in the communication database, and checking the translated input with the plurality of units in the communication data structure until a match is found.

The method of operating chatbots through multiple channels may comprise selecting a unit in the communication data structure based on the comparison between the input and the plurality of units in the communication data structure. If the input matches one of the plurality of units in the communication data structure, the matched unit may be selected. If the input does not match any of the plurality of units in the communication data structure, a selection algorithm may be used to select a unit. The selection algorithm may conduct an approximate matching. The approximate matching may comprise determining one or more units in the communication data structure that may approximately match the received input, providing the user with one or more feedbacks associated with one or more approximately matched units, and if the user chooses one of the feedbacks, selecting the unit associated with the chosen feedback. The received input may be recorded as a variation to a reference unit. The selection algorithm may conduct a random selection. The random selection may be conducted if the approximate matching is not successful. The random selection may determine a user's expected feedback based on the user's historical communication data and/or other users' historical communication data. The selection algorithm may be a machine learning algorithm.

The method of operating chatbots through multiple channels may also comprise processing the selected unit to generate instructions coded in the unit. The instructions may comprise performing a plurality of activities. The plurality of activities may include, but not limited to, receiving one or more inputs from a user, checking one or more units in the communication data structure, determining whether the input matches one unit in the communication data structure, selecting a communication path if there is a match between the input and one unit in the communication data structure, randomly selecting a unit/communication path according to a selection algorithm if no match is found, and providing a feedback to the user based on the selected communication path.

The method of operating chatbots through multiple channels may also comprise selecting a communication path based on the instructions coded in the selected unit. The communication path may comprise a plurality of units. The communication path may be an artificial intelligent communication path. The communication path may be a real human communication path. The communication path may navigate through a plurality of units to compare the user's input with a plurality of units, select one unit based on the comparison between the user's input and the plurality of units, randomly select a unit based on a selection algorithm, provide feedback to the user, and wait for further input from the user. The communication path may be ended when the user choose to close the channels hosting the chatbot communication. The communication path may be unidirectional. The communication path may be a loop. In some cases, the communication path may be optimized to seamlessly navigate users through a deviation and then come back to the original conversation without custom coding.

The method of operating chatbots through multiple channels may also comprise providing a feedback to the user based on the selected communication path. The feedback may be in the form of, but not limited to, text, voice, image, and video. The feedback may be text-based, HTML, image, video, audio, and avatar animation such as smiling. The feedback may provide clickable features for the user to add code, images, video, audio, and animation. The feedback may be a request, a question, an answer, a demand, or an instruction to the user. The feedback may be any type of information related to the user, including, but not limited to, the answers to the user's general questions, the balance of the credit card of the user, the way to make a payment by the user, the phone number requested by the user, the local time, the addresses requested by the user, the email addresses requested by the user, the local weather, the latest news, and the bills of the user.

In another aspect, a method of operating chatbots through multiple channels may comprise selecting one or more channels, wherein the one or more channels host one or more chatbots, wherein at least one of the one or more chatbots has a communication data structure comprising a plurality of communication paths, wherein each communication path comprises a plurality of units. The descriptions and explanations of the one or more channels, the communication data structure, the plurality of communication path, and the plurality of units disclosed herein may be similar to the descriptions and explanations in the previous paragraphs.

The method of operating chatbots through multiple channels may further comprise receiving one or more inputs from a user through the one or more channels. The input may be in the form of, but not limited to, text, voice, image, and video. The input may include or relate to any type of information of the user, including, but not limited to, the first name of the user, the last name of the user, the birthday of the user, the nationality of the user, the race of the user, the gender of the user, the hobbies of the user, the phone number of the user, the email address of the user, the social security number of the user, the driver's license number of the user, the password of the user, the credit card information of the user, the address of the user, the zip code of the user, and the answers to security questions of the user. The input may be a request, a question, an answer, a demand, or an instruction from the user. The one or more inputs of the user may be used to obtain a communication identity of the user. The input may be processed by any suitable algorithms or methods useful for data capturing, aggregation, data cleaning, normalization, voice processing, information extraction, intent analysis or various other analysis purposes. Such algorithms or methods may include, but not limit to, statistical modeling, linguistic processing, natural language processing techniques, pattern matching, machine learning, trend analysis, and logical queries on the data and the like.

The method of operating chatbots through multiple channels may further comprise producing a communication identity of the user based on one or more inputs from the user. The communication identity of the user can be extracted using suitable algorithms or techniques as described above. The communication identity of the user may comprise a plurality of identity elements. The plurality of identity elements may correlate to the user's inputs. The user's inputs may be associated to a plurality of units in the communication data structure. The plurality of units may be processed to yield instructions to update the plurality of identity elements. The plurality of identity elements may enable the chatbot to better personalize a communication with the user according to the communication identity of the user. The communication identity of the user may represent whether the user is, a credit customer, an enterprise/company, or an employee of the enterprise/company. The communication identity may be created by updating the plurality of identity elements of the user when a unit coded with instructions to update the identity elements is processed.

The plurality of identity elements may comprise, but not limited to, the content of the communication, the user's interest, the user's gender, the user's occupation, the user's education, the user's nationality, the user's race, the user's hobbies, the user's personality, the user's demographic, the user's input, and an activity irrelevant to the communication. One or more algorithms may be used to update the plurality of identity elements and/or producing the communication identity of the user. To produce the communication identity of the user, the one or more algorithms may be used to analyze a set of identity elements of a user, and generate the communication identity of the user based on the analysis. The one or more algorithms may comprise machine learning algorithms, natural language processing algorithms or other information extraction algorithms or methods. The communication identity may be obtained through machine learning using existing customer data. The existing customer data may be historical voice call logs or chat messages. The communication identity may be obtained through continued learning during a live communication between the user and the chatbot. The communication identity may be obtained through collecting customer feedback to measure relevance, accuracy, and precision of responses.

The method of operating chatbots through multiple channels may further comprise selecting a unit in the communication data structure based on the communication identity. If the communication identity obtained based on user's inputs matches one of communication identities stored in the communication data structure, a unit associated with the matched communication identity may be selected. If the communication identity obtained based on user's inputs does not match any one of communication identities stored in the communication data structure, a selection algorithm may be used to select a unit. The selection algorithm may conduct an approximate matching. The approximate matching may comprise determining one or more communication identities stored in the communication data structure that may approximately match to the communication identity obtained based on user's inputs, providing the user with one or more feedbacks associated with one or more approximately matched communication identities, and if the user chooses one of the feedbacks, selecting the unit associated with the chosen communication identity. The chosen communication identity may be recorded as a variation to an existing communication identity stored in the communication data structure. The selection algorithm may conduct a random selection. The random selection may be conducted if the approximate matching is not successful. The random selection may determine a user's expected feedback based on the user's historical communication data and/or other users' historical communication data. The selection algorithm may be a machine learning algorithm.

The method of operating chatbots through multiple channels may also comprise processing the selected unit to generate instructions coded in the unit. The instructions may comprise performing a plurality of activities. The plurality of activities may include, but not limited to, receiving one or more inputs from a user, checking one or more units in the communication data structure, determining whether a communication identity obtained based on user's inputs matches one communication identity of a particular user stored in communication database, selecting a communication path if there is a match between a communication identity obtained based on user's inputs and one communication identity of a particular user stored in the communication database, randomly selecting a unit according to a selection algorithm if no match is found, and providing a feedback to the user based on the selected communication path. The unit may further perform an assessment on one or more communication identities and an external source and report the result of the assessment.

The method of operating chatbots through multiple channels may further comprise selecting a communication path based on the instructions coded in the selected unit. The communication path may comprise a plurality of units. The communication path may be an artificial intelligent communication path. The communication path may be a real human communication path. The communication path may navigate through a plurality of units to compare the user's input with a plurality of units, select one unit based on the comparison between a communication identity obtained based on user's inputs and one communication identity of a particular user stored in the communication database, randomly select a unit based on a selection algorithm, provide feedback to the user, and wait for further input from the user. The communication path may be ended when the user choose to close the channels hosting the chatbot communication. The communication path may be unidirectional. The communication path may be a loop.

The method of operating chatbots through multiple channels may further comprise providing a feedback to the user based on a selected communication path. The feedback may be in the form of, but not limited to, text, voice, image, and video. The feedback may be text-based, HTML, image, video, audio, and avatar animation such as smiling. The feedback may provide clickable features for the user to add code, images, video, audio, and animation. The feedback may be a request, a question, an answer, a demand, or an instruction to the user. The feedback may be any type of information related to the user, including, but not limited to, the answers to the user's general questions, the balance of the credit card of the user, the way to make a payment by the user, the phone number requested by the user, the local time, the addresses requested by the user, the email addresses requested by the user, the local weather, the latest news, and the bills of the user. The selected communication path may be a customized communication path based on the user's communication identity. The customized communication path may comprise at least one of, but not limited to, customized content, customized layout, customized presentation, customized format, customized robot action and customized source of information.

In another aspect, a chatbot system may comprise a communication database. The communication database may comprise a communication data structure. The communication database may further comprise a communication component, a dictionary component, a training component, and a universal component. The communication data structure may comprise a plurality of communication paths. The communication path may comprise a plurality of units. The communication database may store one or more chatbots. The communication database may store any information, including, but not limited to, the user's communication with the chatbot, the communication identities, the identity elements, the reference units, information obtained during the production of a chatbot, and the instructions coded in the units.

The chatbot system may control the data transmission between the communication database and an application server. The application server may transmit a user's input to the communication database. The application server may display a feedback provided by the communication database to the user. The application server may host a plurality of communication channels, including, but not limited to, a website, email, text message, digital virtual assistant, smart home device, interactive voice response (IVR) systems, Facebook Messenger, Twilio app, Skype app, Slack app, WeChat app, Telegram app, Viber app, Line app, Microsoft Team app, Cisco Spark app, Amazon Chime app and various other conversational channels.

In another aspect, a method of building a multi-channel chatbot system may comprise receiving one or more training datasets. The one or more training datasets may be stored in the communication database. The one or more training datasets may comprise, but not limited to, a group of questions and responses, variations of a group of questions and answers, information specific to an industry, a group of identity elements, a group of communication identities, and a communication data structure associated with another chatbot. The method of building a multi-channel chatbot system may further comprise building a communication data structure according to the one or more training datasets. Machine learning techniques may be used to build a communication data structure. The machine learning techniques may be deep neural networks (DNNs). The DNNs can include convolutional neural networks (CNNs) and recurrent neural networks (RNNs). The communication data structure may comprise a plurality of communication paths. The communication path may comprise a plurality of units.

In an embodiment, the methods and systems in the presenting disclosure may be used by insurance companies. In this situation, the user may be a primary named insured of an insurance policy. An input to the system may include, but not limited to, whether the user is the primary named insured, first name and last name of the user/primary named insured, birthday of the user/primary named insured, social security number of the user/primary named insured, description of a loss, risk address of the loss, risk zip code of the loss, home address of the user/primary named insured, zip code of the user/primary named insured, payment information of the user/primary named insured, and a policy number of the user/primary named insured. The communication identity may be a primary named insured or non-primary named insured. The feedback may include, but not limited to, an answer to a question asked by the user/primary named insured, a question to the user/primary named insured, and an instruction to the user/primary named insured.

Reference will now be made to the figures, wherein like numerals refer to like parts throughout. It will be appreciated that the figures and features therein are not necessarily drawn to scale.

FIG. 1 shows an example of a block diagram of a multi-channel messaging platform in which a digital assistant system of the present disclosure may be implemented. The digital assistant system may be a chatbot system. The network environment may comprise one or more user devices 120, a digital assistant server 100, an application server 110, a database 101. Each of the components 100, 110, 120, 101 may be operatively connected to one another via network 130 or any type of communication links that allows transmission of data from one component to another. The application server 110 may host one or more channels that support the chatbot. The chatbot server 100 may host a virtual assistant such as a chatbot which is integrated with the one or more channels. A user may interact with the chatbot via the one or more communication channels using one or more user devices 120. The database 101 may be a data warehouse storing data related to a service provided through the chatbot, associated user data or other information. Although FIG. 1 illustrates a single application server and a single chatbot server, the disclosure is not limited thereto. In some embodiments, multiple application servers may be included in the network and each application server may host a communication channel.

A chatbot system may be implemented anywhere in the network environment, and/or outside of the network environment. In some embodiments, the chatbot system may be implemented on a server 100 in the network. alternatively, the chatbot system may be implemented in a distributed computing environment, such as the cloud. In other embodiments, the chatbot may be implemented on the user device 120. In some further embodiments, a plurality of chatbot systems may be implemented on one or more servers, user devices, and/or distributed computing environment. Alternatively, the chatbot system may be implemented in one or more databases. The chatbot system may be implemented using software, hardware, or a combination of software and hardware in one or more of the above-mentioned components within the network environment.

In some embodiments, the chatbot system may comprise a dialogue management module, a machine learning module and an interface module. The dialogue management module may be configured to manage one or more communication flows. The dialogue management module may comprise multiple flows and may provide logistics based on the context and intent of a user. The flows may be well-crafted that provide convenience and accurate service as requested by a user. In some cases, the dialogue management module may be configured to update a flow/path based on collected data. For instance, the dialogue management module may collect data of different users across different channels during multiple flows/paths, an improved flow/path may be generated based on the actions taken by the user. The machine learning module may comprise using of natural language processing (NLP), artificial intelligence (AI) or machine learning technologies to extract an intent and/or entity from a user input. The machine learning module may be configured to train a model to understand user's intent specific to a service (e.g., insurance). In some cases, the model may be refined and updated as real-time data are collected. The interface module may be configured to interface to the multiple channels and/or the database. In some cases, the interface module may be configured to synchronize communication flows across multiple channels associated with a single user. The interface module may be configured to access a database for retrieving information involved in a flow/path. For instance, when the chatbot provides insurance related query service, the chatbot may access an insurance policy library and/or user profiles to provide an answer to the user. In another instance, the chatbot may access the database in order to retrieve an AI model or a flow path. In other instances, information communicated in a conversation with a chatbot on a first channel may be stored in the database, and such information may be retrieved to continue the same conversation carried on a second channel.

A server may include a web server, an enterprise server, or any other type of computer server, and can be computer programmed to accept requests (e.g., HTTP, or other protocols that can initiate data transmission) from a computing device (e.g., user device and/or wearable device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The chatbot may be integrated into any communication channels accessed through user devices 120. User devices may be computing device configured to perform one or more operations consistent with the disclosed embodiment. User devices may include mobile systems or desktop systems. Examples of user devices may include mobile phone, tablet, smartwatch, digital camera, personal navigation device, tablets, personal digital assistants (PDAs), laptop or notebook computers, desktop computers, media content players, television sets, video gaming station/system, virtual reality systems, augmented reality systems, microphones, smart home device, a navigation system in a vehicle (e.g. for changing the destination, turning on the highlights), a control panel on a machine (e.g. for turning on the machine, controlling the power of the engine), an artificial intelligence controller of a building (e.g. for opening a door, turning on a light, changing the temperate of the room), or any electronic device configured to enable the user to access the chatbot via a communication channel. The user device may or may not be a handheld object. The user device may or may not be portable. In some cases, the user device may be carried by a human user. In some cases, the user device may be located remotely from a human user, and the user can control the user device using wireless and/or wired communications.

The user device may include a communication unit, which may permit the communications with one or more other components in the network. In some instances, the communication unit may include a single communication module, or multiple communication modules. In some instances, the user device may be capable of interacting with one or more components in the network environment using a single communication link or multiple different types of communication links. The user devices 120 may interact with the chatbot system 100 via the network 130.

User device may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations.

In some embodiments, users may utilize the user devices 120 to interact with the chatbot system 100 by way of one or more software applications (i.e., client software) running on and/or accessed by the user devices, wherein the user devices 120 and the application server/chatbot server may form a client-server relationship. For example, the user devices 120 may run existing mobile communication applications (e.g., text/SMS) through which the user may establish a communication channel with the chatbot. The user may utilize one or more applications with the integrated chatbot to access insurance related information.

In some embodiments, the client software (i.e., software applications installed on the user devices 120) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

User device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show graphical elements that permit a user to communicate with a chatbot within the GUI. The user device may also be configured to display webpages and/or websites on the Internet. One or more of the webpages/websites may be hosted by the application server or a third party server.

User devices may be associated with one or more users. In some embodiments, a user may be associated with a unique user device. Alternatively, a user may be associated with a plurality of user devices. In an example, a user as described herein may refer to an individual or a group of individuals who are seeking insurance related information through the chatbot. For example, the user may be policy holders who would like to know the due date for the next payment, the status of the current claim, or report a loss; the user may be insurance agents who seek for live underwriting assistance, commission or guidance on creating an endorsement; the user may be "c level" executives who would like to know the written premium, loss ratio, or the amount of reported claims.

The network 130 may be a communication pathway between the application server, the user devices 120, and other components of the network. The network 130 may comprise any combination of local area and/or wide area networks using both wireless and/or wired communication systems. For example, the network 130 may include the Internet, as well as mobile telephone networks. In one embodiment, the network 130 uses standard communications technologies and/or protocols. Hence, the network 130 may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

The communication database 101 may comprise a plurality of components comprising a communication data structure 103, a communication component 104, a dictionary component 105, a universal component 106, and a training component 107. Information stored in one component may be connected with information stored in other components. One piece of information may be stored in multiple components. The communication database 101 may be in communication with the user devices, application server and/or chatbot server over a network 130.

The communication database 101 may store all chatbots developed by the chatbot server 109. The communication database 101 may be configured to leverage analytics for responses to sophisticated questions or complicated conversations. The communication database 101 may also store knowledge learned during the development of the chatbots. When new chatbots are created, information of the new chatbots may be stored in the dictionary component 105. The dictionary component may be operatively coupled with the communication component 104 to update variations of references inputs. The communication component 104 may comprise many variations of reference inputs to match user's inputs during a communication between the user and the chatbot. For example, a way to express a greeting may comprise variations of "Hello," "Hi," and "How are you" in the communication component 104. If a user's input is "Hello there," a match would be made with "Hello" variation in the communication component 104. The phrase "Hello there" may be stored in the communication component 104 and updated in dictionary component 105 as one of the reference inputs.

The dictionary component 105 may be accessible by the system during converting a user's input into a recognizable variations stored in the communication component. The user's input may comprise misspellings, slangs, or foreign language terms. The dictionary component 105 may be responsible to connect a user's input to variations in the communication component 104. In some embodiments, the dictionary component 105 may comprise a learned model generated using artificial intelligence techniques. The training component 107 may store templates of feedbacks to the user. The training component 107 may store one or more training datasets. The one or more training datasets may comprise, but not limited to, a group of questions and responses, variations of a group of questions and answers, information specific to an industry, a group of identity elements, a group of communication identities, and a communication data structure associated with another chatbot. The universal component 106 may store one or more universal units. The universal units may be selected based on a selection algorithm. The universal units may be selected based on a random selection algorithm. The universal units may be selected when the user's inputs do not match any of the reference units or variations thereof.

The one or more databases may utilize any suitable database techniques. For instance, structured query language (SQL) or "NoSQL" database may be utilized for storing the analytics as described above. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the chatbot system may construct the database in order to deliver the data to the users efficiently. For example, the chatbot system may provide customized algorithms to extract, transform, and load (ETL) the data. In some embodiments, the chatbot system may construct the databases using proprietary database architecture or data structures to provide an efficient database model that is adapted to large scale databases, is easily scalable, is efficient in query and data retrieval, or has reduced memory requirements in comparison to using other data structures.

The application server 110 may provide one or more channels for the user to interact with the chatbots. The one or more channels may comprise social media channels such as Facebook®, LinkedIn®, Twitter®, YouTube, Pinterest®, Google+ or Instagram®, weblogs and the like, mobile apps and software such as Hangouts®, WhatsApp®, Snapchat®, Line®, Wechat®, Skype®, emails, smart home devices, interactive voice response (IVR) systems, enterprise website, SMS apps (e.g., iMessage®), messenger APIs and various others. In the illustrated example, the one or more channels include a company website 112, a Facebook Messenger 113, a smart home device (Alexa®) 114, and emails 115.

The methods and systems provided herein can be used by any business entities, enterprises, organizations, industries or be utilized in any applications. For example, the methods and systems provided herein may be used by insurance companies. FIGS. 2A-FIG. 3D show examples of flows or communication paths in various situations associated with insurance service. These communication paths may be well-crafted to provide a smooth user experience. For example, when a user does not have the requested information handy (e.g., claim number), the chatbot may navigate the communication path by offering alternative prompt or calling the fallback prompt to facilitate customer interactions. For instance, if the chatbot's prompt for a customer's information, such as a claim number, does not result in a valid response, the chatbot may provide alternative prompt requesting other information. In another example, the communication path may be optimized to seamlessly navigate users through a deviation and then come back to the original conversation.

Figure 2A:
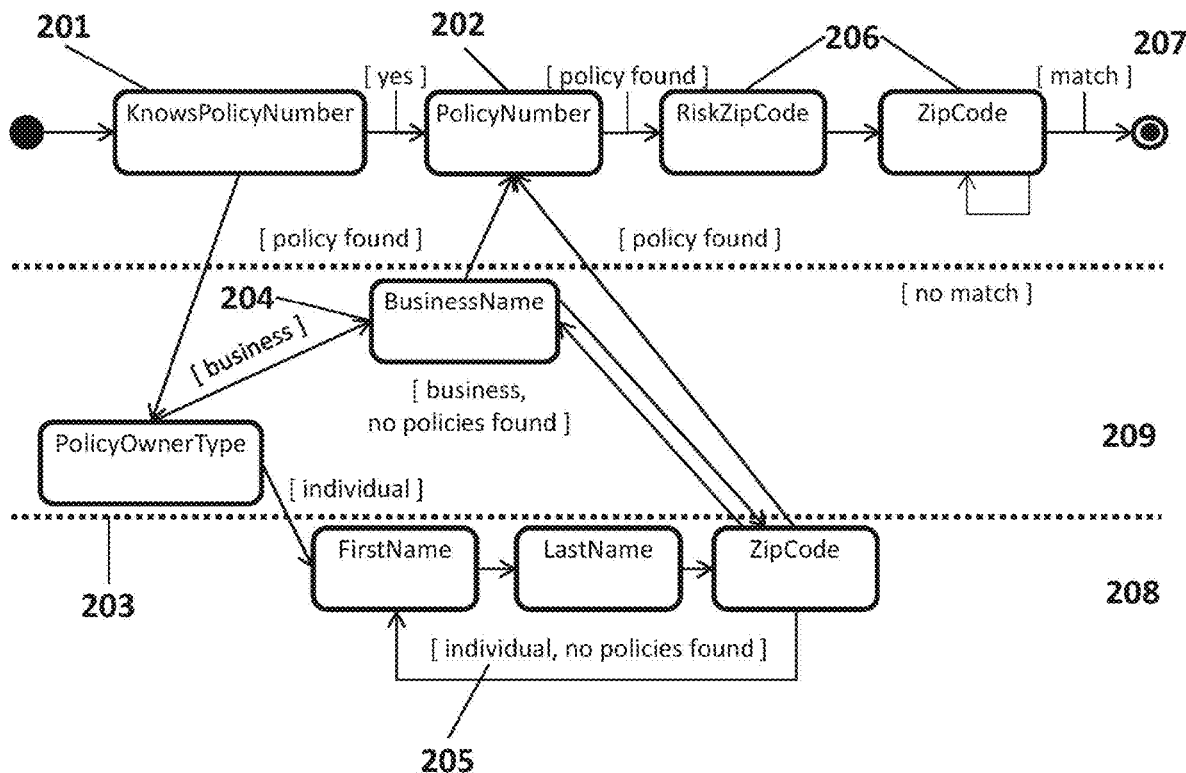
FIG. 2A shows an example of a flow chart of a user's communication with a chatbot to check a payment due date when the chatbot is used by insurance companies.

FIG. 2A shows an example of a flow chart of a user's communication with a chatbot to check a payment due date when the chatbot is used by insurance companies. At the beginning of the communication, the chatbot may ask the user whether he/she knows the policy number 201. If the user knows the policy number, the chatbot may ask the user to provide the policy number 202. If the user does not know the policy number, the chatbot may ask user for alternative information such as the policy owner type 203. The policy owner type may be a business or an individual. If the policy owner type is a business, the chatbot may ask the user about the business name 204. If the business name provided by the user matches any reference unit in the communication data structure, the chatbot may generate policy number to the user. If the policy owner type is an individual, the chatbot will ask the user about his/her first name, last name, and zip code 205. The process of asking the first name, last name, and zip code may be repeated many times until a match is found in the communication data structure. If the first name, last name, and zip code match any reference unit in the communication data structure, the chatbot may generate the policy number to the user. After the policy number is generated, the chatbot may ask the user to provide the risk zip code and zip code 206. The process of asking the zip code may be repeated until a match is found. After matching the zip code, the chatbot may provide a feedback to the user. In the illustrated example, the feedback is the due date of the user's payment. The flow chart in FIG. 2A may be divided into different categories: the high priority category 207, the medium priority category 208, and low priority category 209.

Figure 2B:
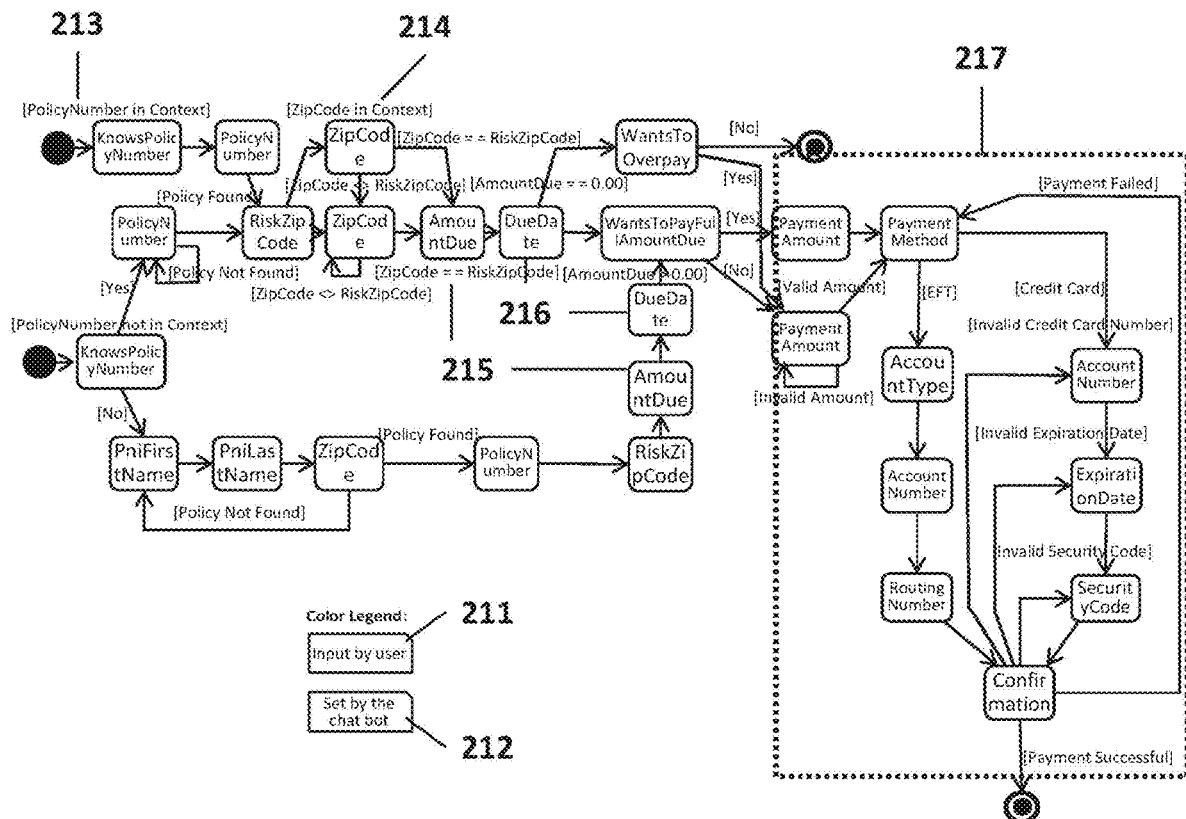
FIG. 2B shows an example of a flow chart of a user's communication with a chatbot to make a payment if the chatbot is used by insurance companies.

FIG. 2B shows an example of a flow chart of a user's communication with a chatbot to make a payment if the chatbot is used by insurance companies. The light color square 211 may represent a user's input. The dark color square 212 may represent a chatbot's feedback. At the beginning of the communication, the chatbot may check whether the policy number is in context 213. If the policy number is in context, the chatbot may obtain the policy number and then check the risk zip code and zip code 214. The chatbot may then check whether the zip code is in context. If the zip code is in context, the chatbot may obtain an amount due 215 of the user's policy. If the zip code is not in the context, the chatbot may ask the user to enter the zip code. The process of entering the zip code may be repeated until a match is found. If the risk zip code equals to the zip code, the chatbot may obtain the amount due 215 of the user's policy. After obtaining the amount due 215, the chatbot may then obtain the information of the due date 216. If the amount due is zero, the chatbot may ask the user whether the user wants to overpay. If the user does not want to overpay, the communication may be terminated. If the user wants to overpay, the chatbot may direct the user to a payment process 217. If the amount due is larger than zero, the chatbot may ask the user whether the user wants to pay the full amount due. According to the user's answer, the chatbot may direct user to different payment processes 217.

At the beginning of the communication, if the policy number is not in context, the chatbot may ask the user whether the user knows the policy number. If the user knows the policy number, the chatbot may ask the user to provide the policy number. The process of providing the policy number may be repeated many times until a match is found. The chatbot may then check the risk zip code. The chatbot may check whether the zip code is in context. If the zip code is in context, the chatbot may obtain the amount due 215 of the user's policy. If the zip code is not in the context, the chatbot may ask the user to enter the zip code. The process of entering the zip code may be repeated until a match is found. If the risk zip code equals to the zip code, then the chatbot may obtain the amount due 215 of the user's policy. After obtaining the amount due, the chatbot may obtain the information about the due date 216. If the amount due is zero, the chatbot may ask the user whether the user wants to overpay. If the user does not want to overpay, the communication may be terminated. If the user wants to overpay, the chatbot may direct the user to a payment process 217.

If the user does not know the policy number, the chatbot may ask the user's first name, last name, and zip code. The process of asking the user's first name, last name, and zip code may be repeated many times until a match is found in the communication data structure. If the name and the zip code match any unit in the communication data structure, the chatbot may obtain the policy number of the user. After the policy number is obtained, the chatbot may check the risk zip code, the amount due, and the due date. The chatbot may then ask the user whether the user wants to pay the full amount due. According to the user's answer, the chatbot may direct user to different payment processes 217.

During the payment processes 217, if the user wants to pay the full amount due, the chatbot may ask the user which payment method the user wants to choose. If the user does not want to pay the full amount due, the chatbot may ask the user to provide an amount that the user wants to pay. The amount the user wants to pay may have to be above certain threshold in order to proceed to the payment method. The payment method may include a credit card method and electronic transfer method. The process of making the payment may be repeated may times until all the payment information is correct and a payment is received.

Figure 2C:
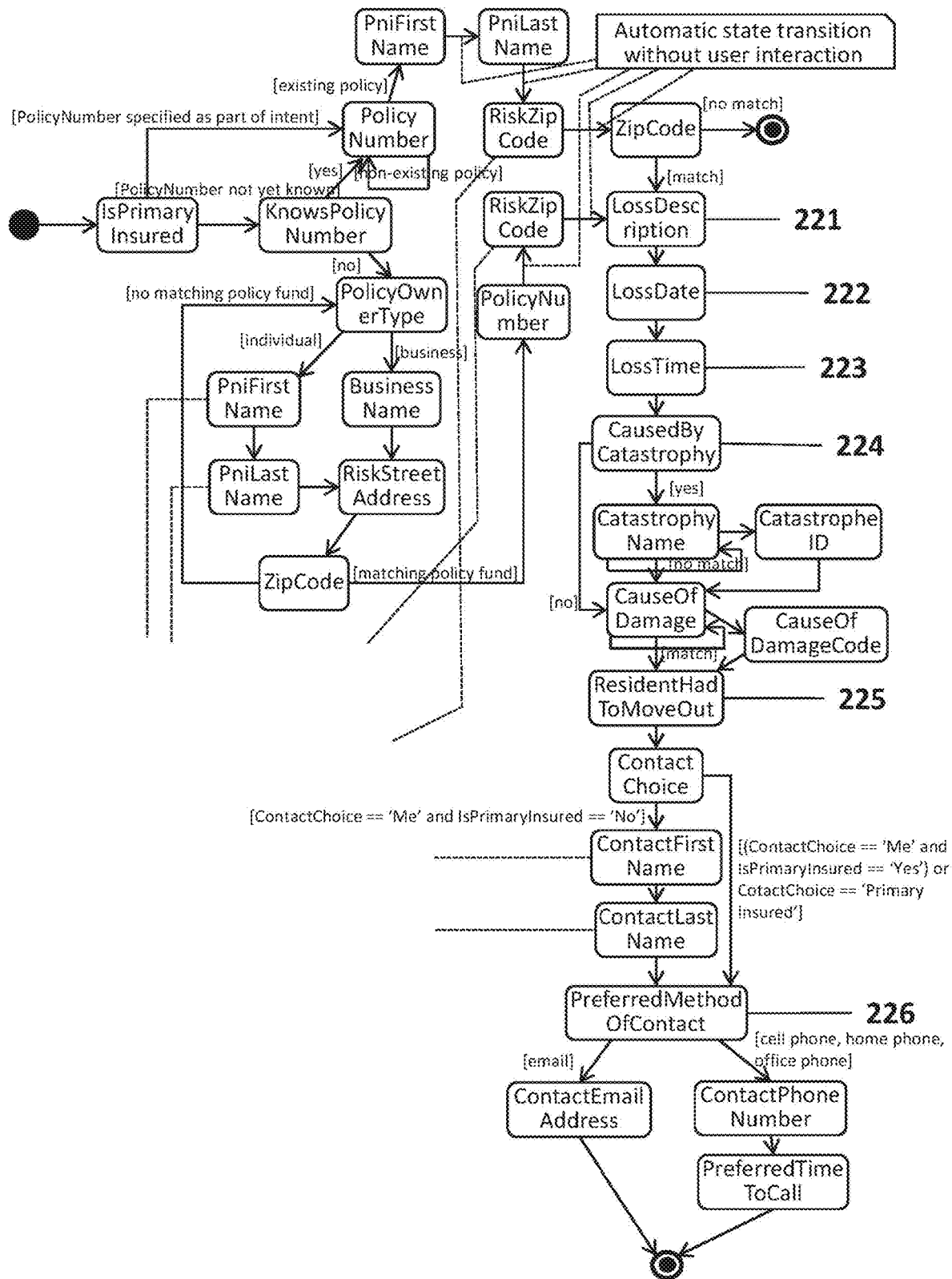
FIG. 2C shows an example of a flow chart of a user's communication with a chatbot to file a claim if the chatbot is used by insurance companies.

FIG. 2C shows an example of a flow chart of a user's communication with a chatbot to file a claim if the chatbot is used by insurance companies. At the beginning of the communication, the chatbot may ask the user whether the user knows the policy number. If the user knows the policy number, the chatbot may ask the user to provide the policy number and the first name of the policy primary insured. The chatbot may then obtain the last name of the policy primary insured, risk zip code, and zip code and check whether there is a match. If no match is found, the communication may be terminated. If a match is found, the chatbot may direct the user to a claim filing process. If the user does not know the policy number, the chatbot may ask user about the policy owner type. The policy owner type may be a business or an individual. If the policy owner type is a business, the chatbot may ask the business name, the risk street address, and zip code. If the policy owner type is an individual, the chatbot may ask the first name, last name, risk street address, and zip code of the policy primary insured. The processing of asking the user's information may be repeated many times until a match is found in the communication data structure. If a match is found, then the chatbot may obtain the policy number and risk zip code. After the policy number is obtained, the chatbot may ask the user to provide the zip code and direct the user to the claim filing process.

During the claim filing process, the chatbot may ask the user to provide a loss description 221, a loss date 222 and a loss time 223. The chatbot may then check whether the loss is created by a catastrophe 224. If the loss is created by a catastrophe, the chatbot may obtain a catastrophe ID. If the loss is not created by a catastrophe, the chatbot may check the cause of damage. If the cause of damage is found, the chatbot may obtain a cause of damage code. The chatbot may further check whether the insured has to move out 225 because of the loss. If the insured has to move out because of the loss, the chatbot may ask the user to provide a choice of contact. If the choice of contact is not the user himself or herself, the chatbot may ask the user to provide the first name, last name, and contact method of the choice of contact. If the choice of contact is the user himself or herself, the chatbot may ask the contact method. The user may choose the contact method 226 among emails, cell phone, home phone, and office phone. The chatbot may then obtain the email addresses and/or phone numbers from the user for the contact method. There may be distinctions between the claim's primary contact and policy primary insured. The first name and last name of the claim's primary contact may be part of the newly created claim. The first name and last name of the policy primary insured may be used to find a policy when the policy number is not available.

Figure 3A:
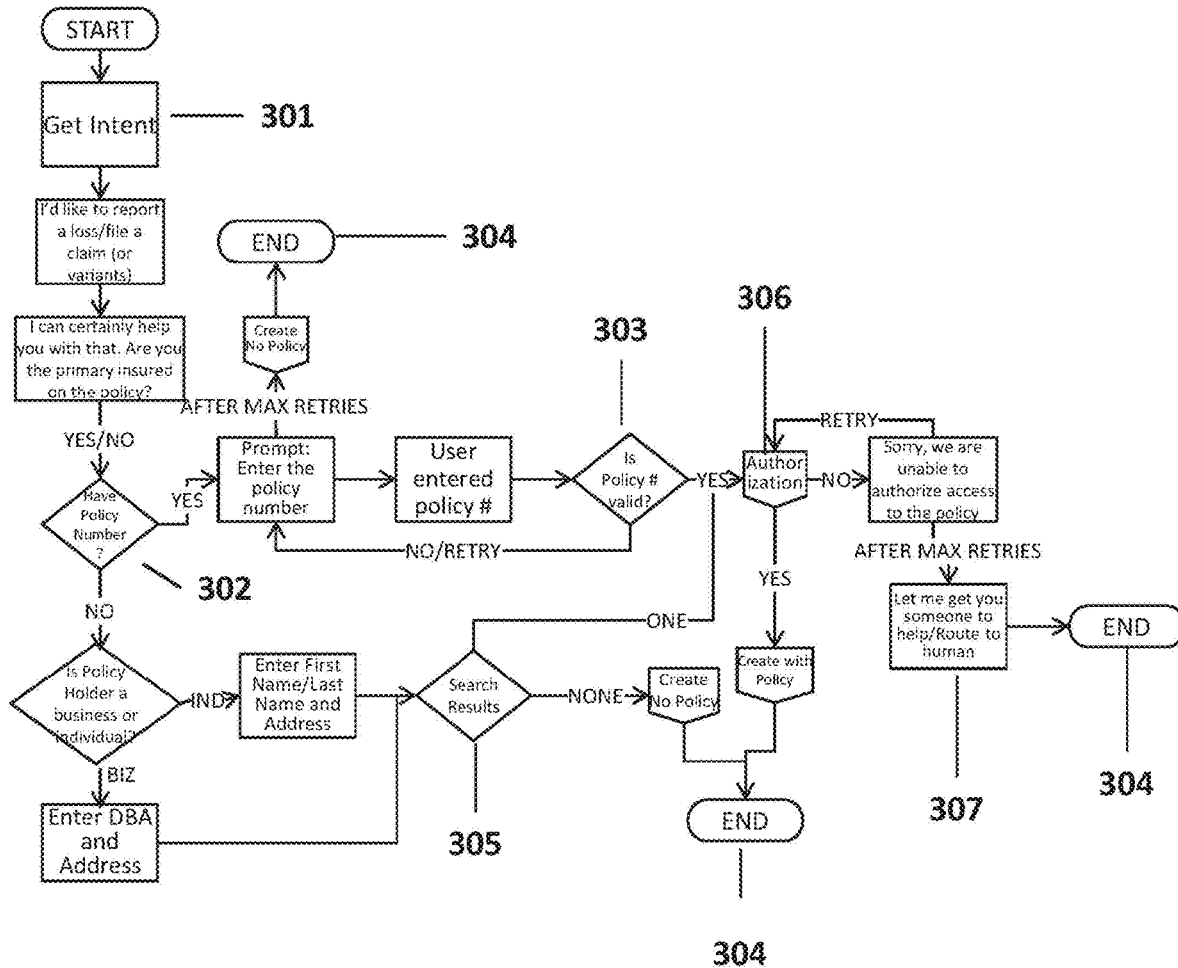
FIG. 3A shows another example of a flow chart of a user's communication with a chatbot to create a claim if the chatbot is used by insurance companies.

FIG. 3A shows another example of a flow chart of a user's communication with a chatbot to create a claim if the chatbot is used by insurance companies. At the beginning of the communication, the chatbot may ask the user to provide an intent 301 for the communication. The user may answer "I'd like to report a loss" or "I'd like to file a claim." The chatbot may then state "I can certainly help you with that. Are you the primary insured on the policy?" The user may answer yes or no. The chatbot may then state "Have policy number?" 302 If the user has a policy number, the chatbot may ask the user to enter the policy number. The chatbot may then search its communication database to decide whether the policy number is valid 303. The process of entering and checking the policy number may be repeated many times until a match is found. If there is no match after maximum retries, the communication may be terminated 304.

If the user does not have a policy number, the chatbot may ask "Is policyholder a business or individual?" If the user is a business, then the chatbot may ask the user to enter the business name and/or address. If the user is an individual, then the chatbot may ask the user to enter the first name, last name, and address. The chatbot may then search 305 its database to check whether there is a match. If there is no match, then the communication may be terminated 304. If there is a match, the chatbot may check whether it can authorize an access to the policy 306. If the chatbot cannot authorize the access to the policy, the chatbot may answer "Let me get you someone to help" and direct the communication with the user to a human representative 307. At this point, the communication between the user and the chatbot may be terminated 304.

Figure 3B:
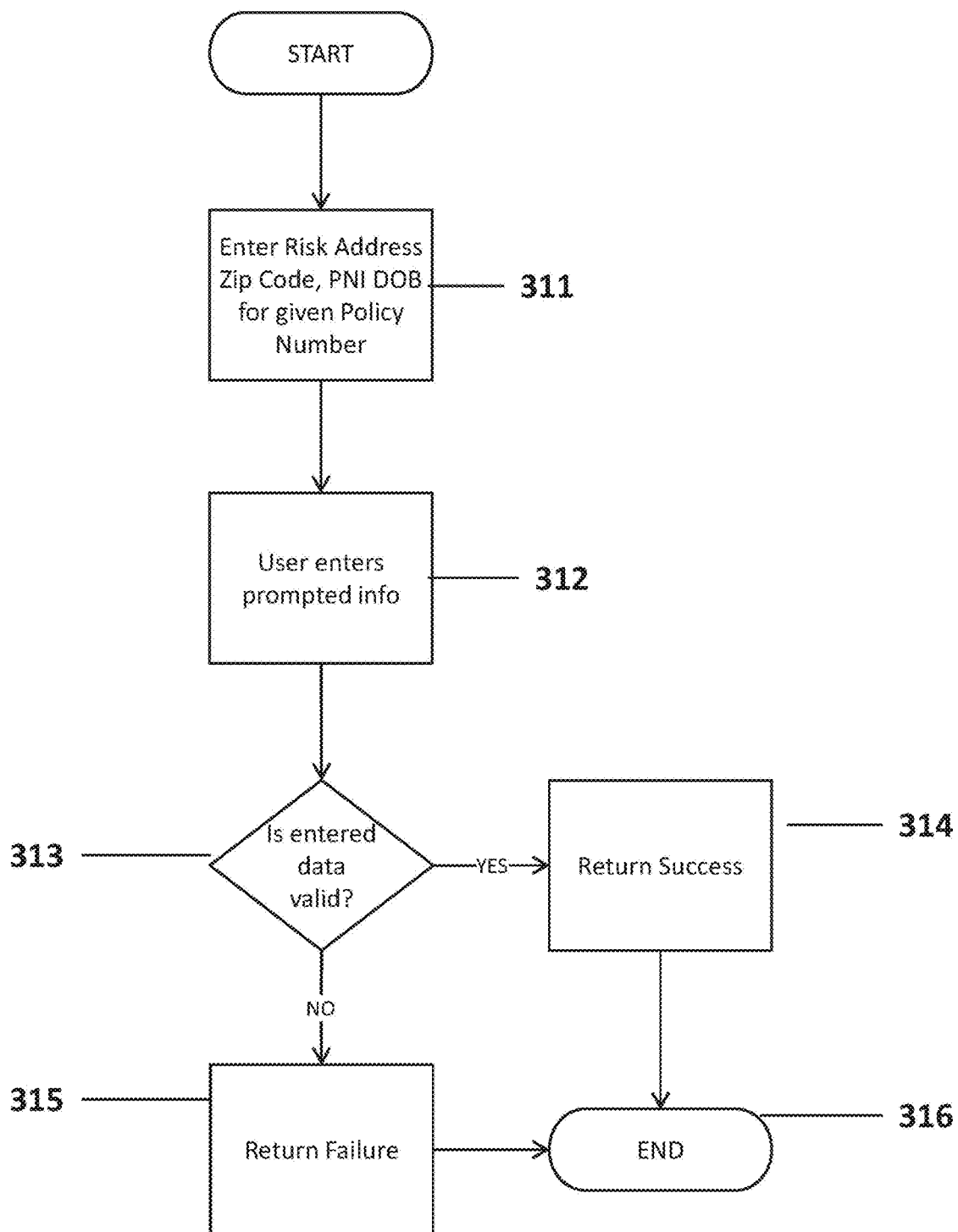
FIG. 3B shows another example of a flow chart of a user's communication with a chatbot to create a claim if the chatbot is used by an insurance company.

FIG. 3B shows another example of a flow chart of a user's communication with a chatbot to create a claim if the chatbot is used by an insurance company. After the access to the policy is authorized, the chatbot may ask the user to enter a risk address, zip code, and the date of birth of the primary named insured for a given policy number 311. After user enters the information 312, the chatbot may then check whether the entered data by the user is valid 313. If the entered data is valid, the chatbot may proceed to a success mode 314. If the entered data is invalid, the chatbot may proceed to a failure mode 315. The communication may be terminated 316.

Figure 3C:
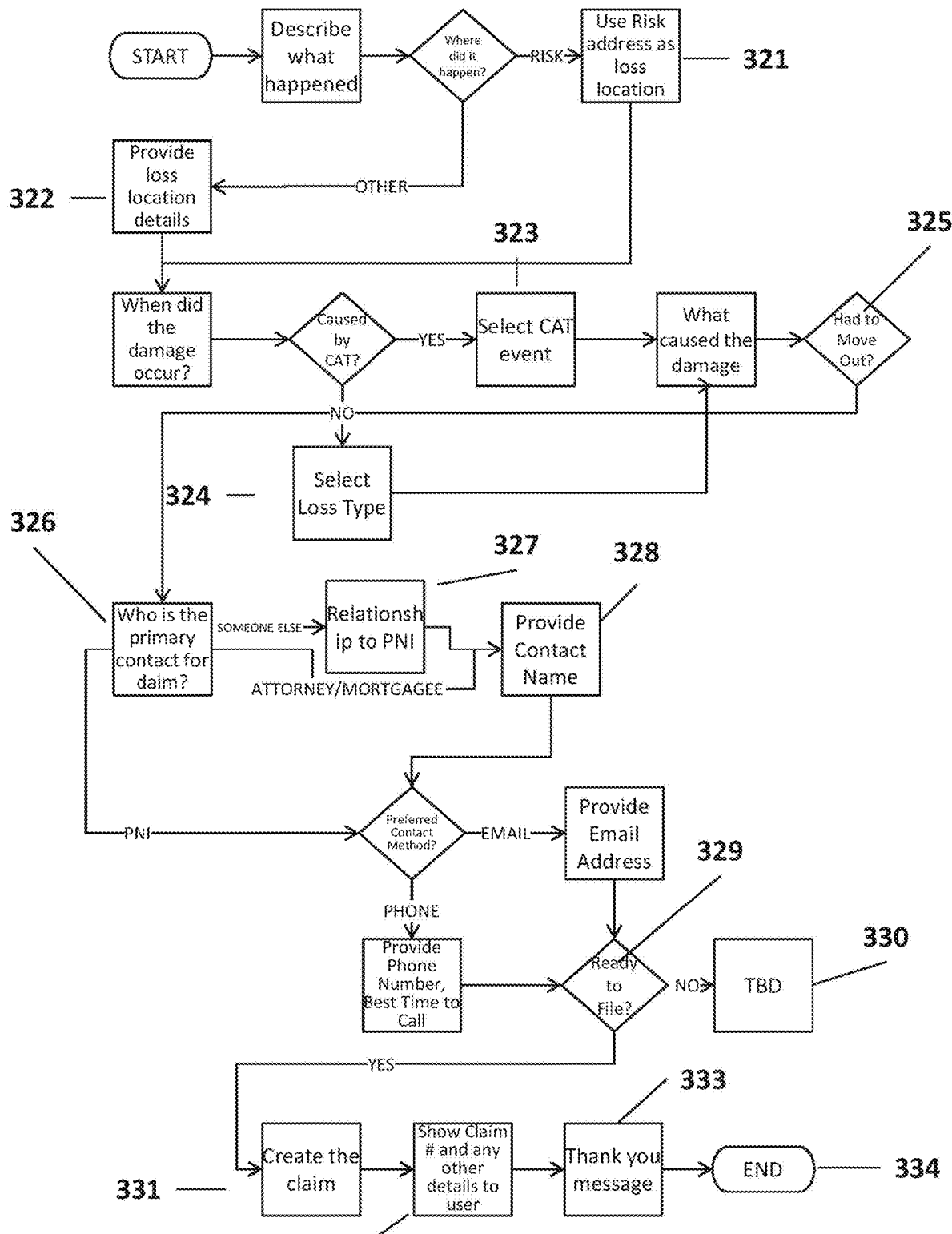
FIG. 3C shows another example of a flow chart of a user's communication with the chatbot to create a claim if the chatbot is used by an insurance company.

FIG. 3C shows another example of a flow chart of a user's communication with the chatbot to create a claim if the chatbot is used by an insurance company. After proceeding to the success mode, the chatbot may state "describe what happened" and "where did it happen?" The user may choose to either use the risk address as the loss location 321 or provide loss location details 322. The chatbot may ask the user "when did the damage occur" and "whether the damage is caused by a catastrophe?" If the damage is caused by a catastrophe, the chatbot may ask the user to select a catastrophe event 323. If the damage is not caused by a catastrophe, the chatbot may ask the user to select a loss type 324. The chatbot may then ask the user "what caused the damage" and "do you have to move out?" 325 Based on the user's answers, the chatbot may ask "who is the primary contact for claim?" 326 The user may select that the primary contact is himself/herself, someone else, or an attorney/mortgagee. If the primary contact is someone else or an attorney/mortgagee, the chatbot may ask their relationships to the primary insured 327 and the contact name 328. The chatbot may ask the contact method. The user may choose either email or phone. After this selection, the chatbot may ask the user whether the user is ready to file a claim 329. If the user is not ready to file a claim, the chatbot may enter a to-be-decided mode 330. If the user is ready to file a claim, the chatbot may enter the claim filing process. The claim filing process may comprise creating the claim 331, showing the claim number and any other details to the user 332, and displaying a thank you message 333. Then the communication may be terminated 334.

Figure 3D:
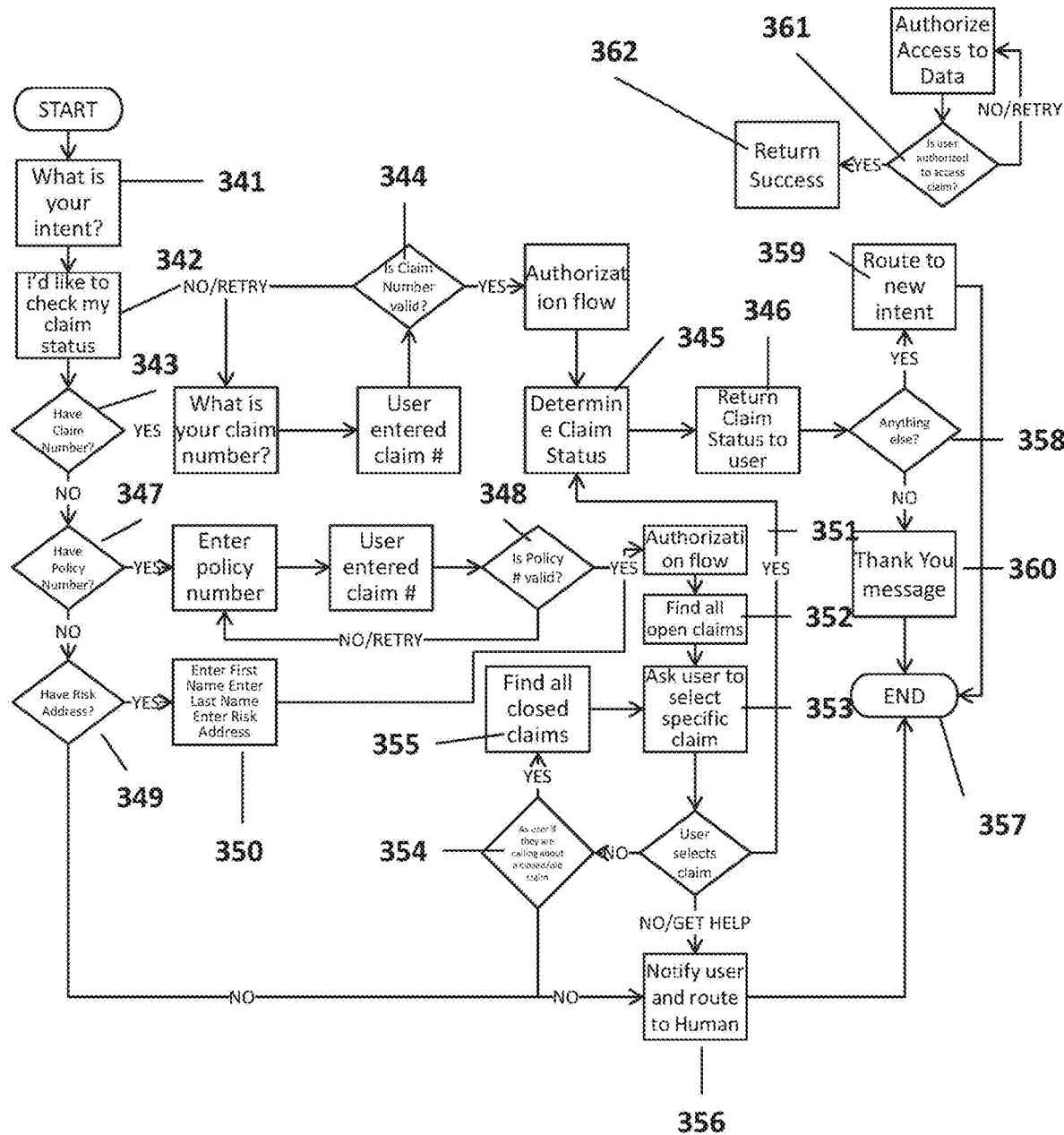
FIG. 3D shows an example of a flow chart of a user's communication with a chatbot to check a claim status if the chatbot is used by insurance companies.

FIG. 3D shows an example of a flow chart of a user's communication with a chatbot to check a claim status if the chatbot is used by insurance companies. At the beginning of the communication, the chatbot may ask the user "what is your intent?" 341 The user may answer "I'd like to check my claim status." 342 The chatbot may ask the user whether he/she has the claim number 343. If the user has the claim number, the chatbot may ask the user to enter the claim number and check whether the entered claim number is valid 344. The process of entering the claim number and checking the entered claim number may be repeated many times until a match is found. Then the chatbot may determine the claim status 345 and return the claim status to the user 346.

If the user does not have the claim number, the chatbot may ask the user whether the user has the policy number 347. If the user has the policy number, the chatbot may ask the user to enter the policy number and check whether the entered policy number is valid 348. The process of entering the policy number and checking the entered policy number may be repeated many times until a match is found. If the user does not have the policy number, the chatbot may ask the user whether the user has the risk address 349. If the user has the risk address, the chatbot may ask the user to enter the first name, last name and the risk address 350.

Then the chatbot may enter the authorization flow 351, find all open claim 352, and ask user to select a specific claim 353. After the user selects a specific claim, the chatbot may determine the claim status 345 and return the claim status to the user 346. If the user does not select any claim, the chatbot may ask the user if the user is calling about a closed or old claim 354. If the user is calling about a closed or old claim, the chatbot may find all closed or old claim 355 and ask the user to select a specific claim 353. The process of asking the user to select a claim may be repeated many times until the user selects a claim. If the user does not select a claim but asks for help or the user does not have the risk address, the chatbot may connect the user with a human representative 356 and the communication between the chatbot and the user may be terminated 357. After returning the claim status to the user, the chatbot may ask whether the user has anything else 358. If the user's answer is yes, the chatbot may ask user's new intent 359. If the user's answer is no, then the chatbot may provide user with a thank you message 360. The communication may be terminated 357. The chatbot may also check whether the user is authorized to access a claim 361. If the user is authorized to access a claim, the chatbot may enter a success mode 362.

Figure 4A:
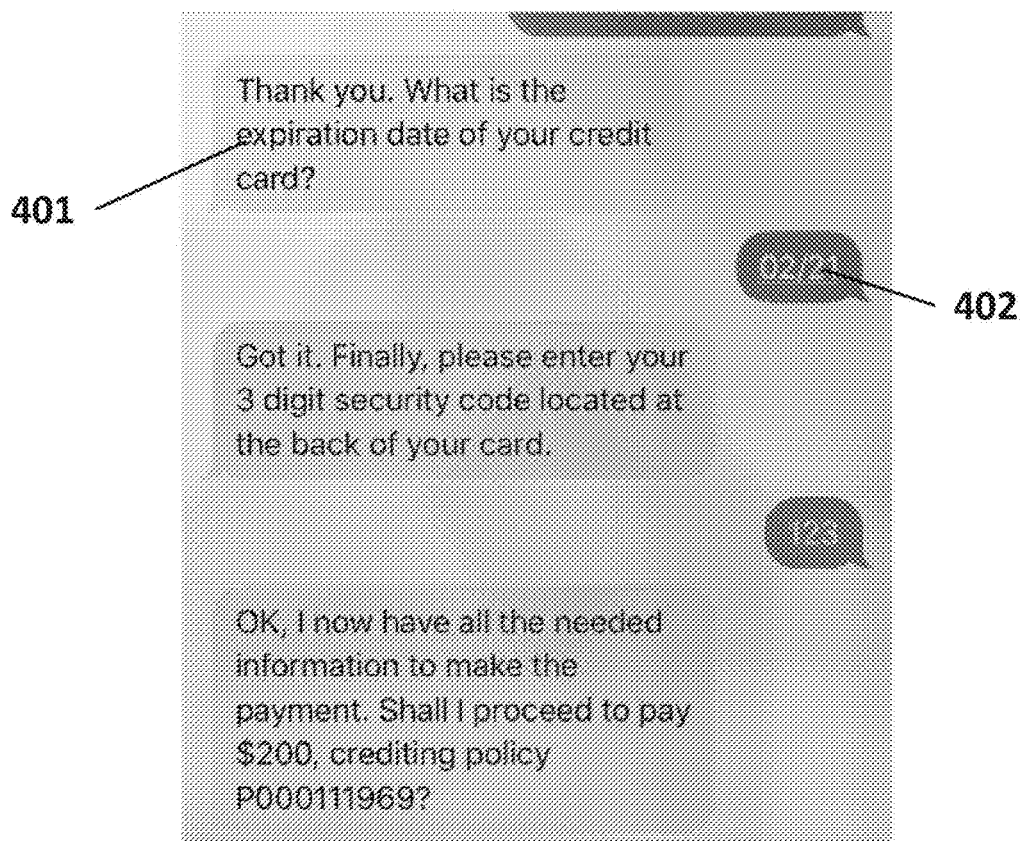
FIGS. 4A-4L show examples of multiple user interfaces of an app on a mobile electronic device regarding a user's communication with the chatbot to make a payment if the chatbot is used by insurance companies.
Figure 4B:
Figure 4C:
Figure 4D:
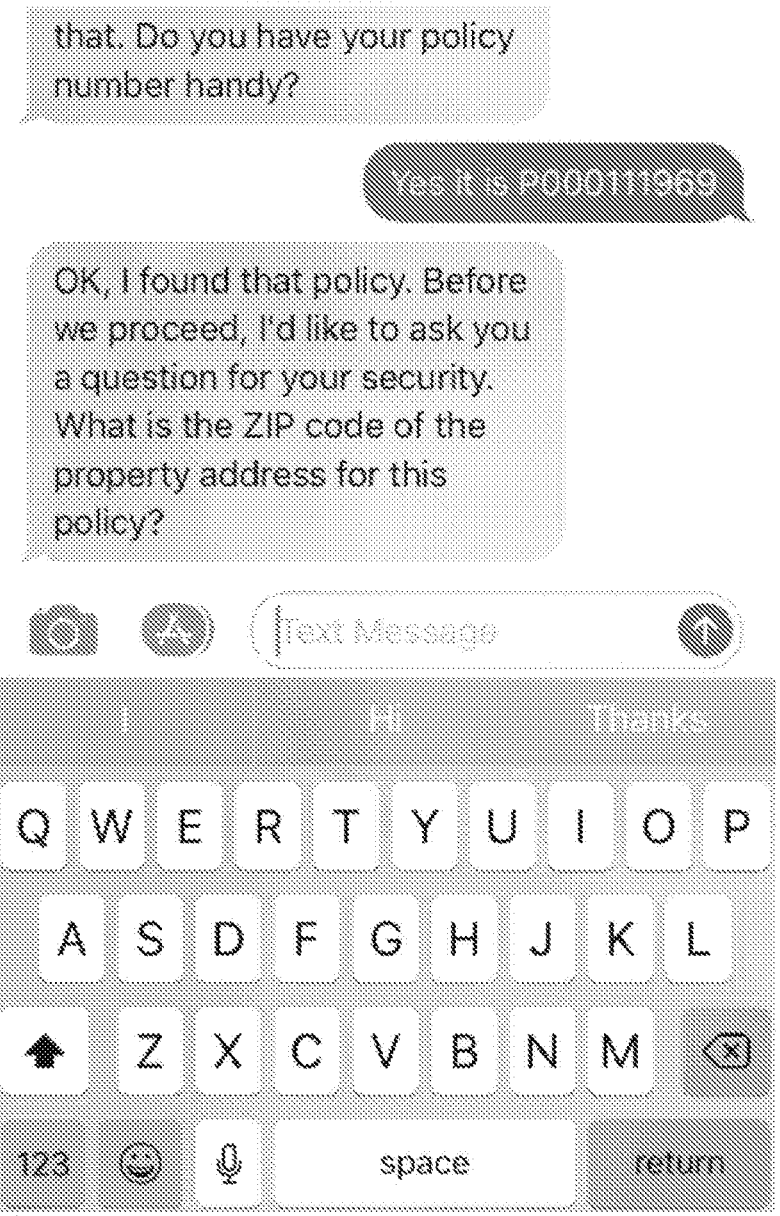
Figure 4E:
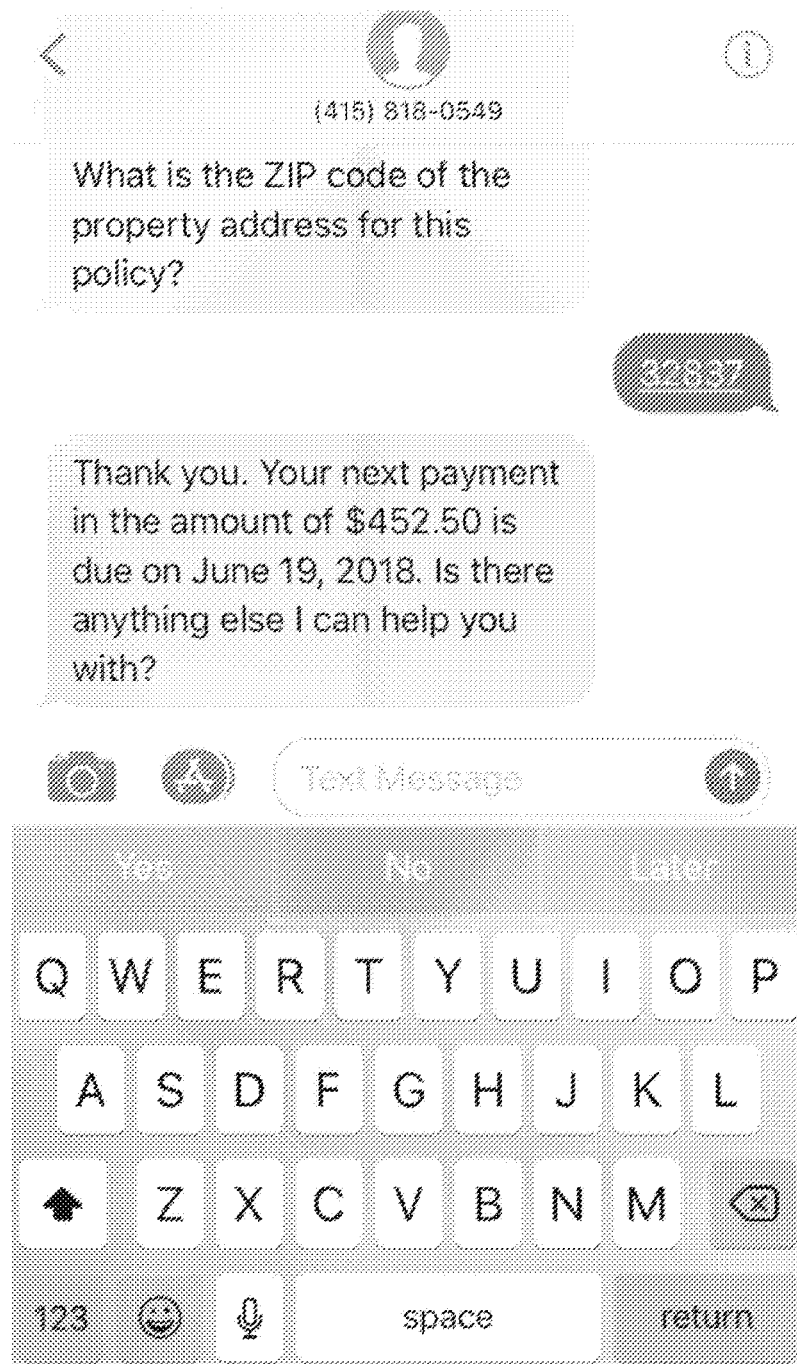

FIGS. 4A-4L show examples of communication with a chatbot over an existing communication channel. These examples illustrate multiple user interfaces of an app on a mobile electronic device regarding a user's communication with the chatbot to make a payment if the chatbot is used by insurance companies. In the illustrated examples, the user interfaces may be similar to a text message interface on a mobile electronic device. FIG. 4A shows that any users may communicate with the chatbot account by internet or by phone through the app. The communication bubbles aligned to the left 401 may represent the feedback provided by the chatbot system. The communication bubbles aligned to the right 402 may represent the input of the user. FIG. 4B shows the chatbot may first state "Hello! What can I do for your?" The user may then answer "I'd like to know when is my payment due." FIG. 4C shows that the chatbot may state "I can certainly help you with that. Do you have your policy number handy?" FIG. 4D shows the user may answer "Yes, it is P000111969." The chatbot may then state that "OK, I found that policy. Before we proceed, I'd like to ask you a question for your security. What is the ZIP code of the property address for this policy?" FIG. 4E shows the user may answer "32837" and the chatbot may reply with "Thank you. You next payment in the amount of $452.50 is due on Jun. 19, 2018. Is there anything else I can help you with?"

Figure 4F:
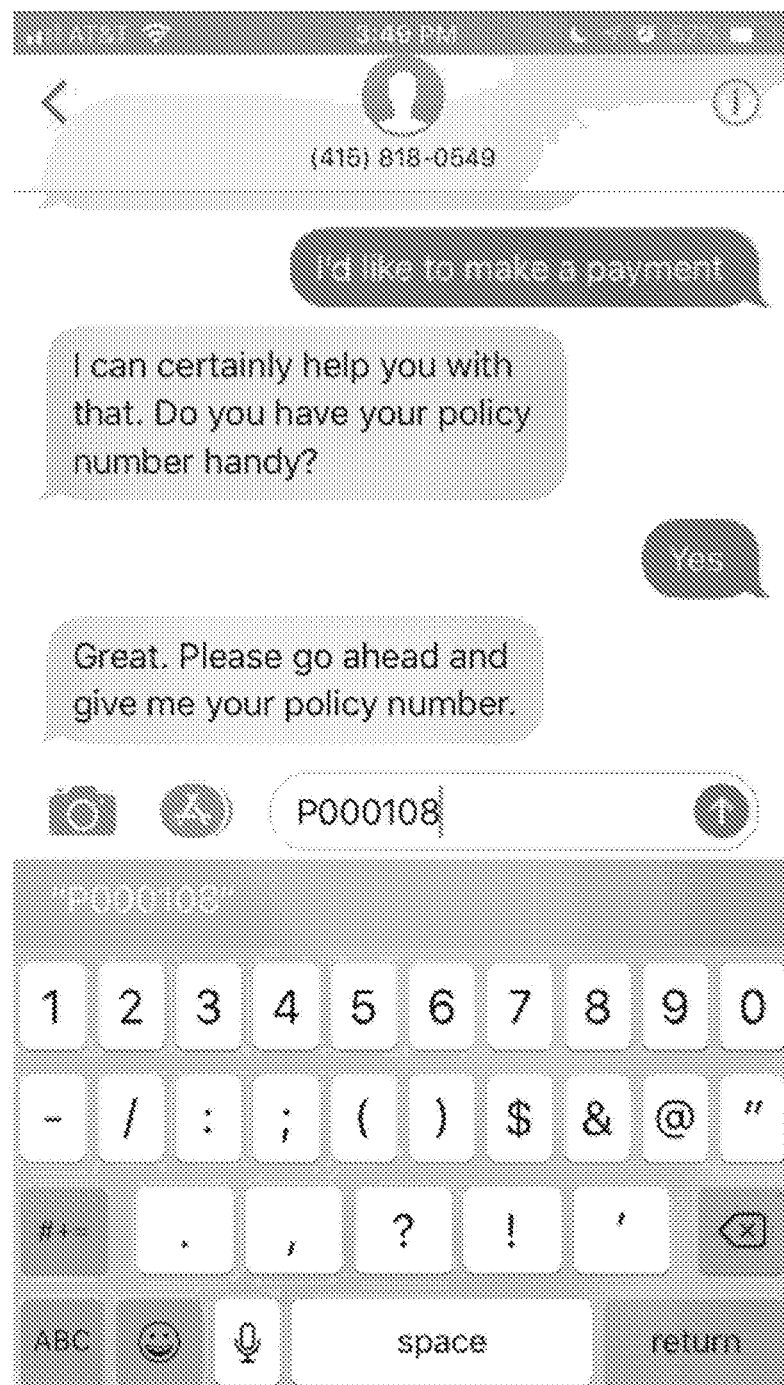
Figure 4G:
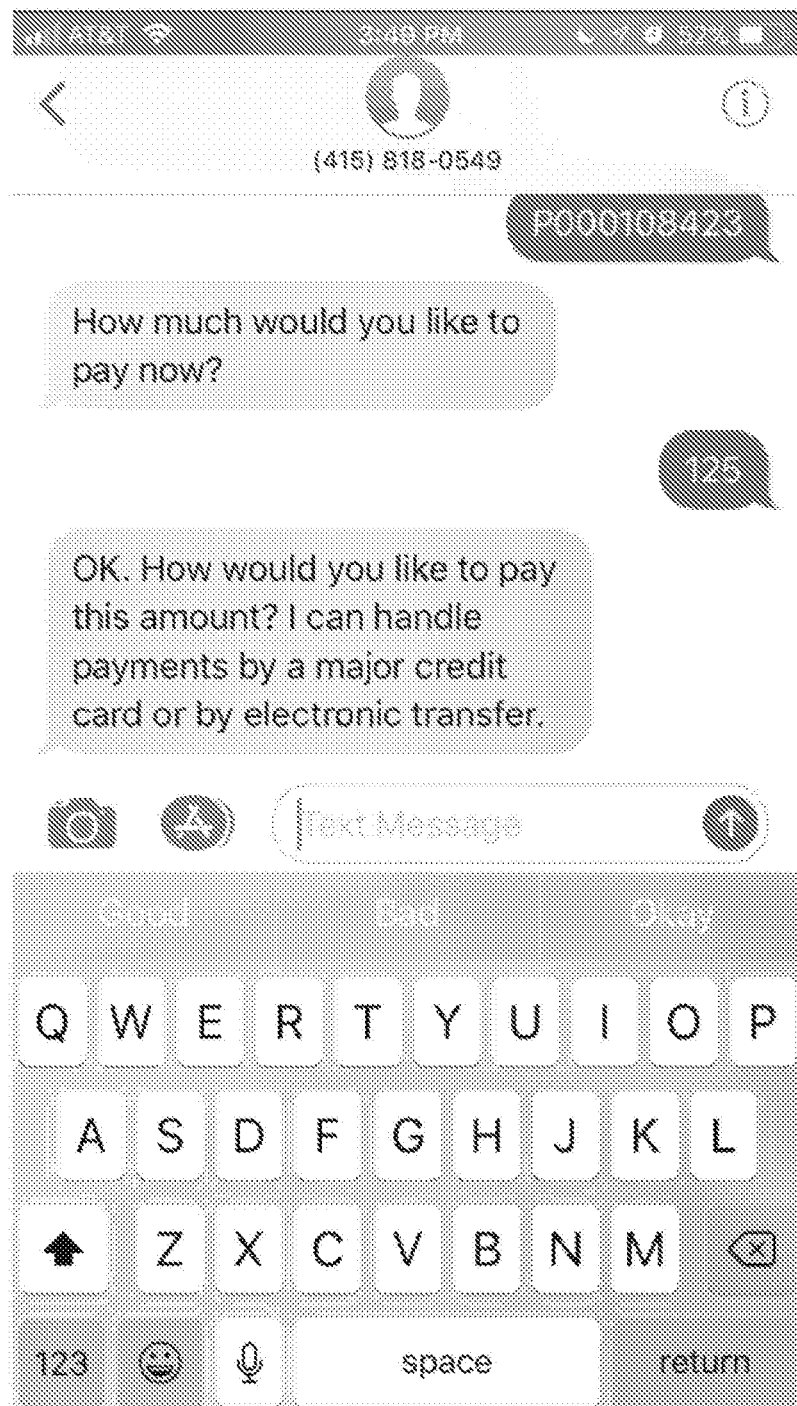
Figure 4H:
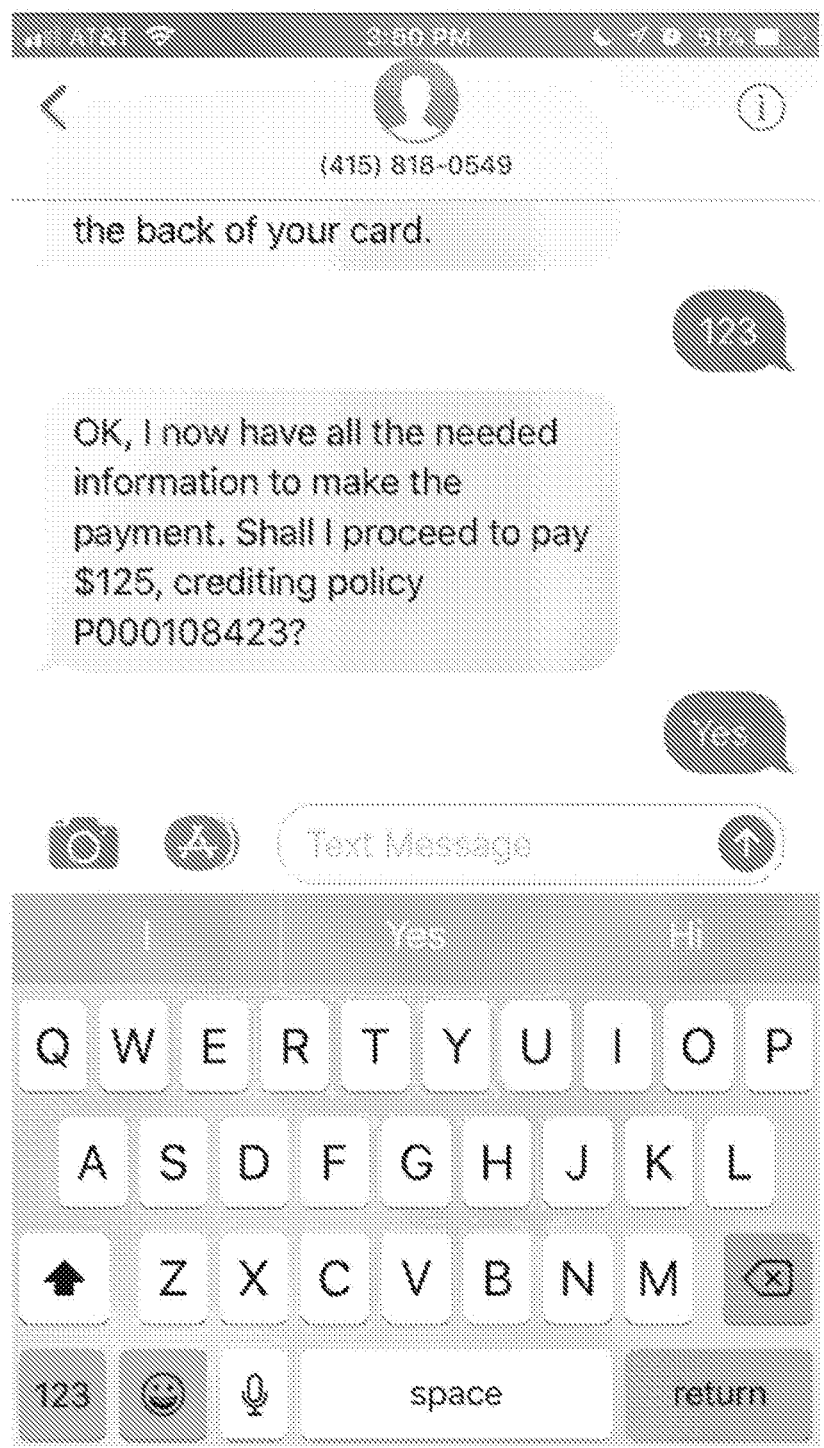

FIG. 4F shows a scenario when a user may make a payment. The user may state "I'd like to make a payment." The chatbot may state "I can certainly help you with that. Do you have your policy number handy?" The user may answer "Yes." The chatbot may state "Great. Please go ahead and give me your policy number." FIG. 4G shows the user may answer "P000108423." The chatbot may state "How much would you like to pay now?" The user may answer "125." The chatbot may state "OK. How would you like to pay this amount? I can handle payments by a major credit card or by electronic transfer." FIG. 4H shows that after the user selects a payment method, provides the credit card number and provides the expiration date of the credit card, the chatbot may ask the security code on the back of the credit card. The user answers "123." The chatbot states "OK. I now have all the needed information to make the payment. Shall I proceed to pay $125, crediting policy P000108423?" The user answers "Yes."

Figure 4I:
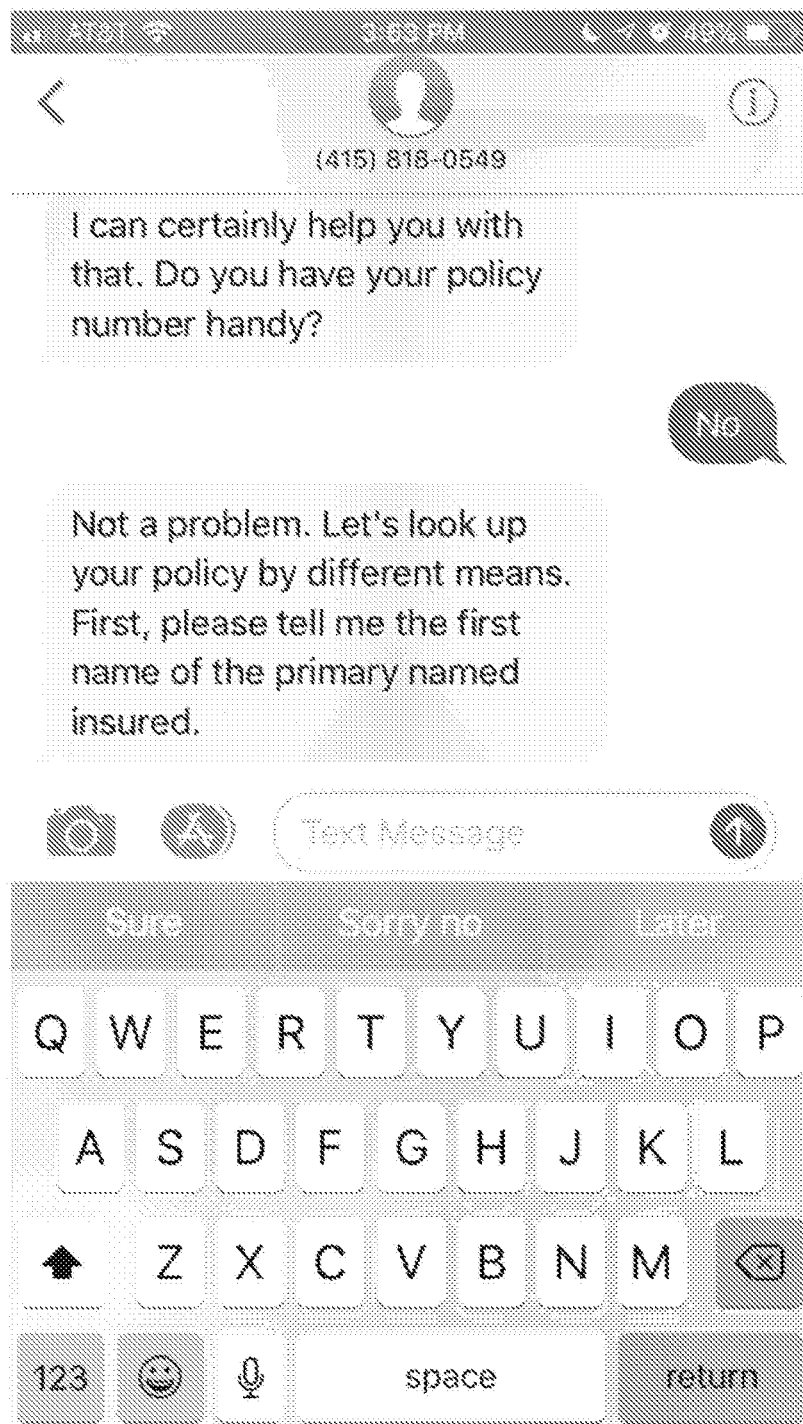
Figure 4J:
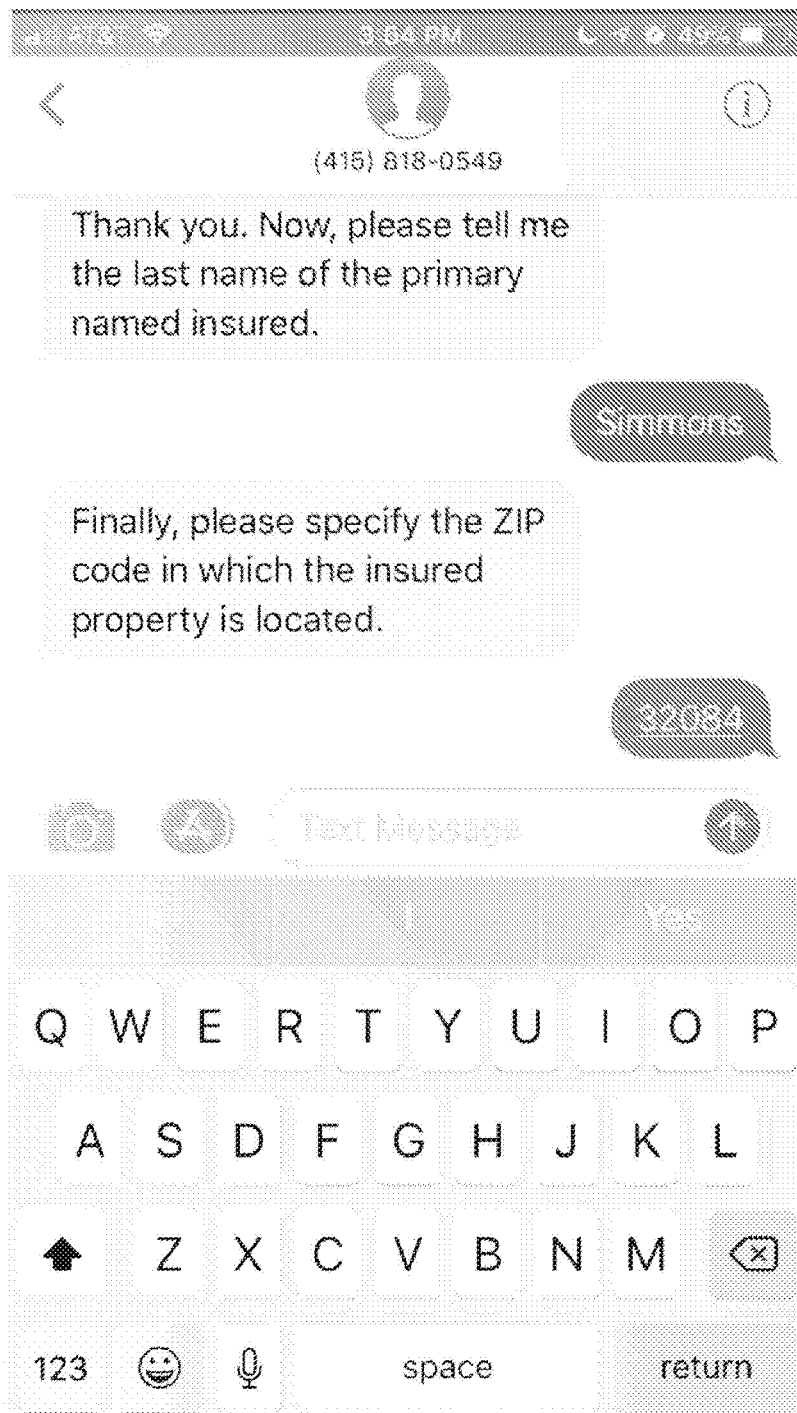

FIG. 4I shows another scenario when the user may not remember the policy number. The chatbot may state "I can certainly help you with that. Do you have your policy number handy?" The user may answer "No." The chatbot may then answer "Not a problem. Let's look up your policy by different means. First please tell me the first name of the primary named insured." FIG. 4J shows that after the user provides the first name, the chatbot may ask "Thank you. Now, please tell me the last name of the primary named insured." The user may answer "Simmons." The chatbot may state "Finally, please specify the ZIP code in which the insured property is located." The user may answer "32084."

Figure 4K:
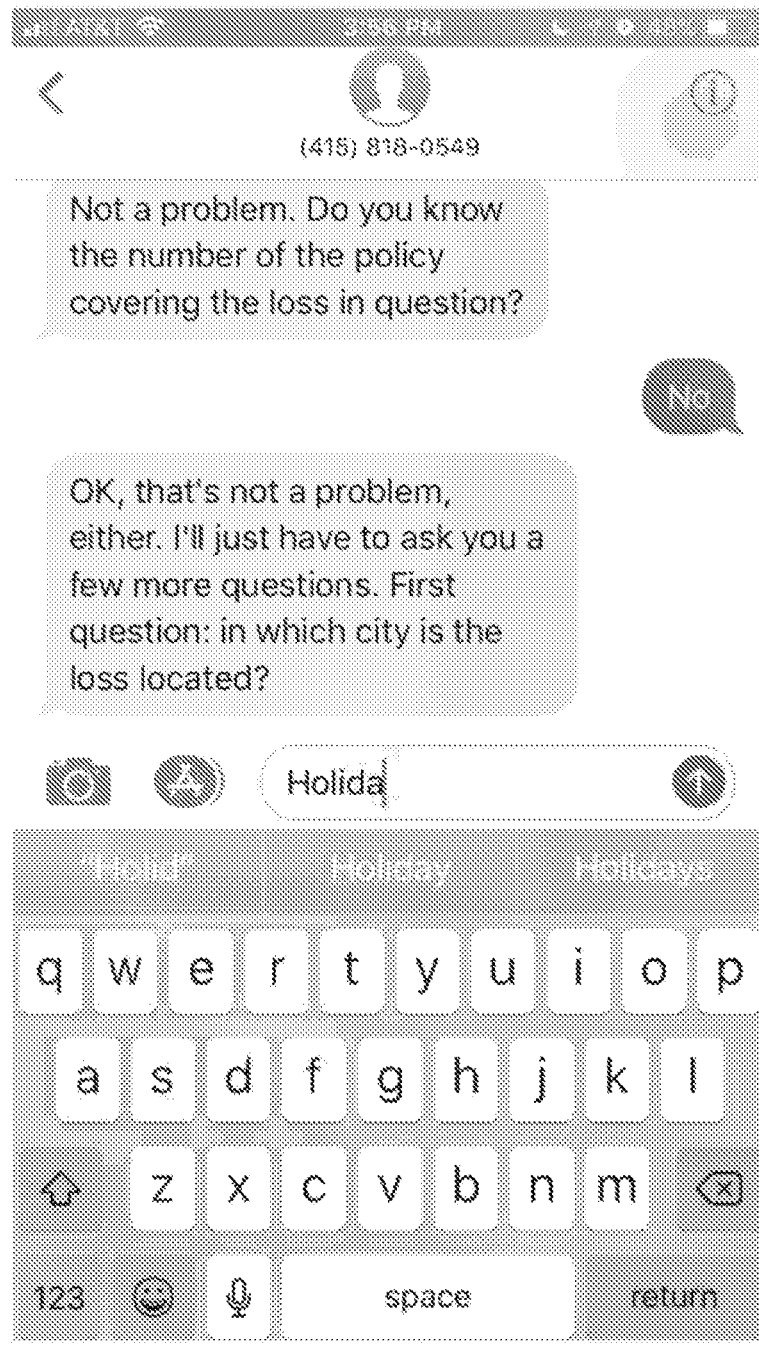
Figure 4L:
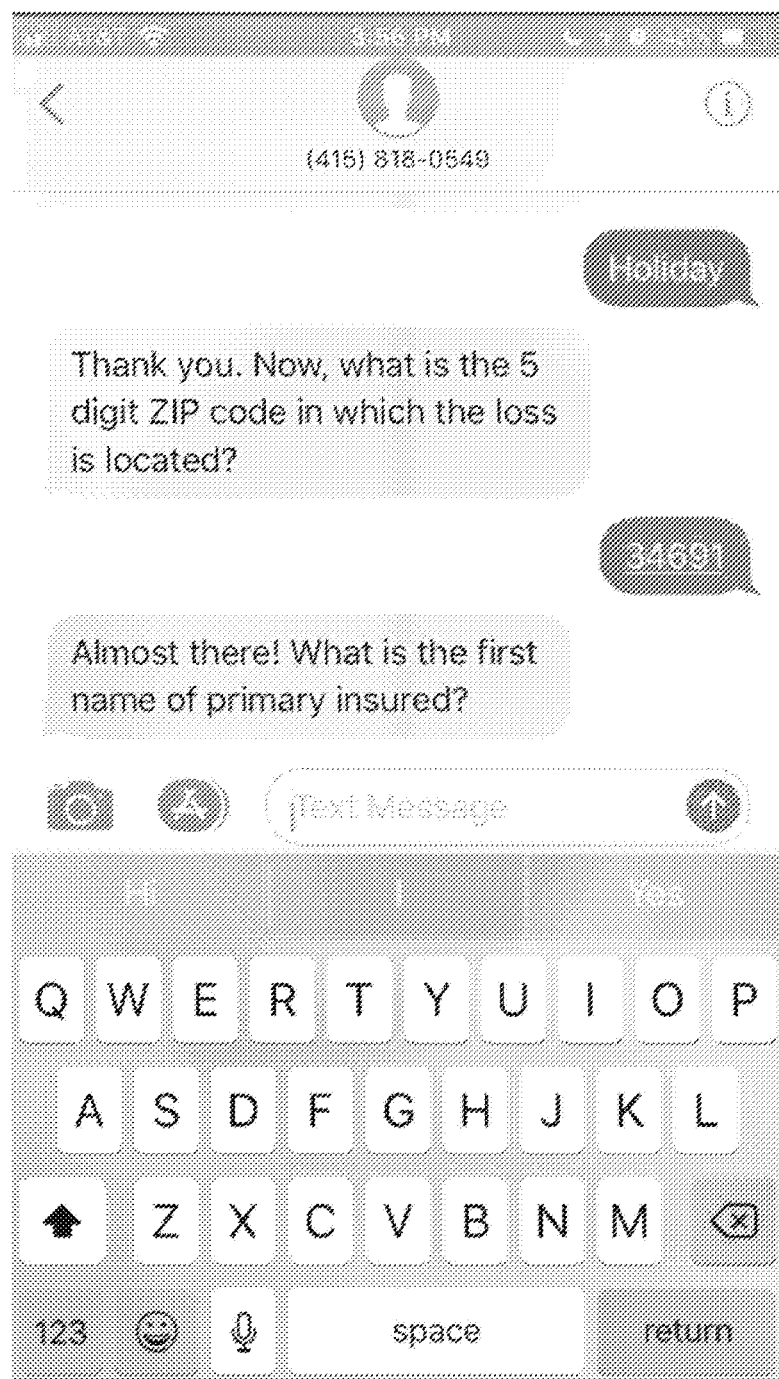

FIG. 4K shows another scenario that the user may not remember the policy number covering the loss in question. The chatbot may state "Not a problem. Do you know the number of the policy covering the loss question?" The user may answer "No." The chatbot may state "OK, that's not a problem either. First question: in which city the loss located?" FIG. 4L shows that the user may answer "Holiday." The chatbot may then answer "Thank you. Now, what is the 5 digit ZIP code in which the loss is located?" The user may answer "34691." The chatbot may then answer "Almost there! What is the first name of primary insured?"

Figure 5A:
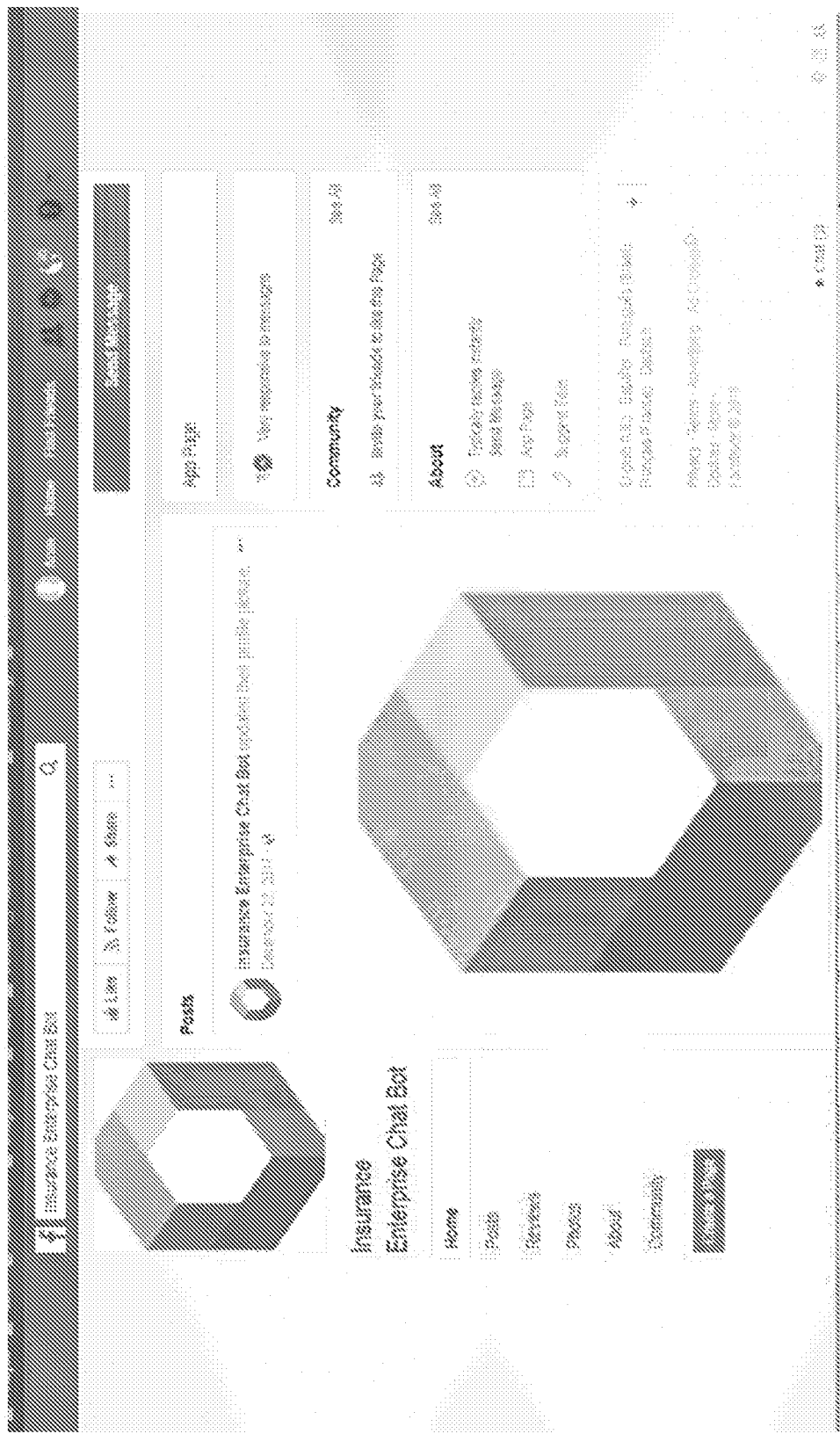
FIGS. 5A-5F show examples of multiple Facebook pages on a desktop system.
Figure 5B:
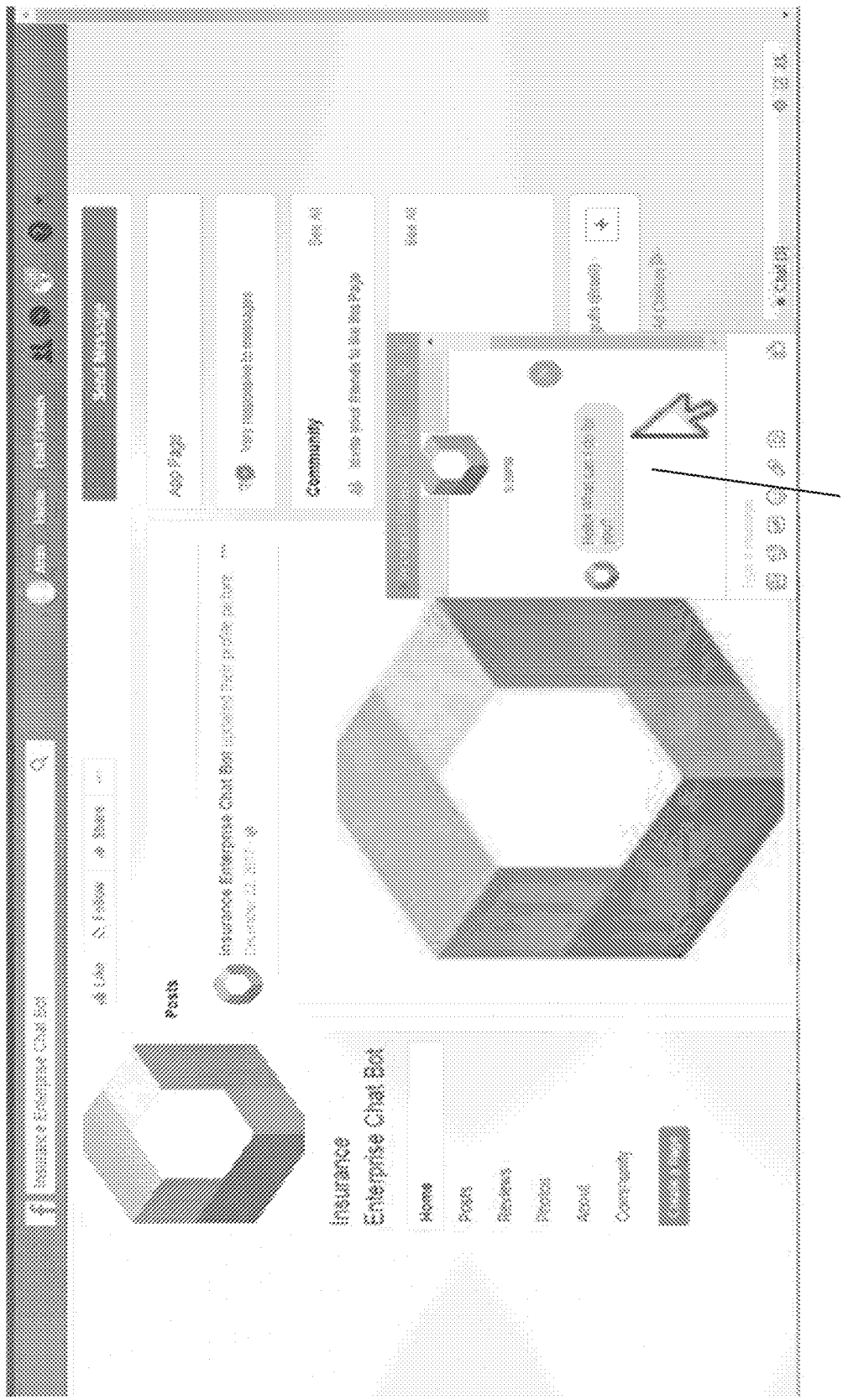
Figure 5C:
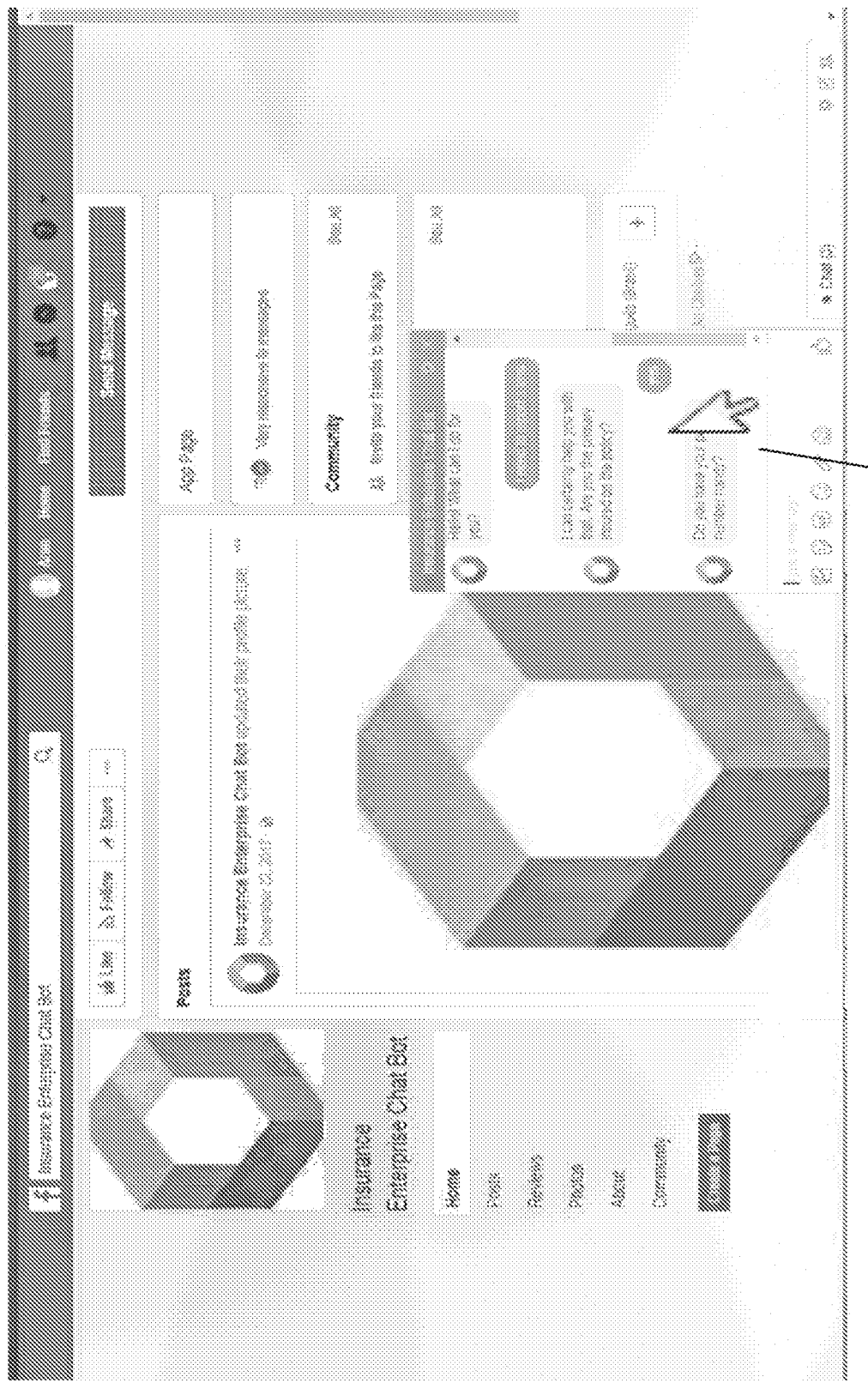
Figure 5D:
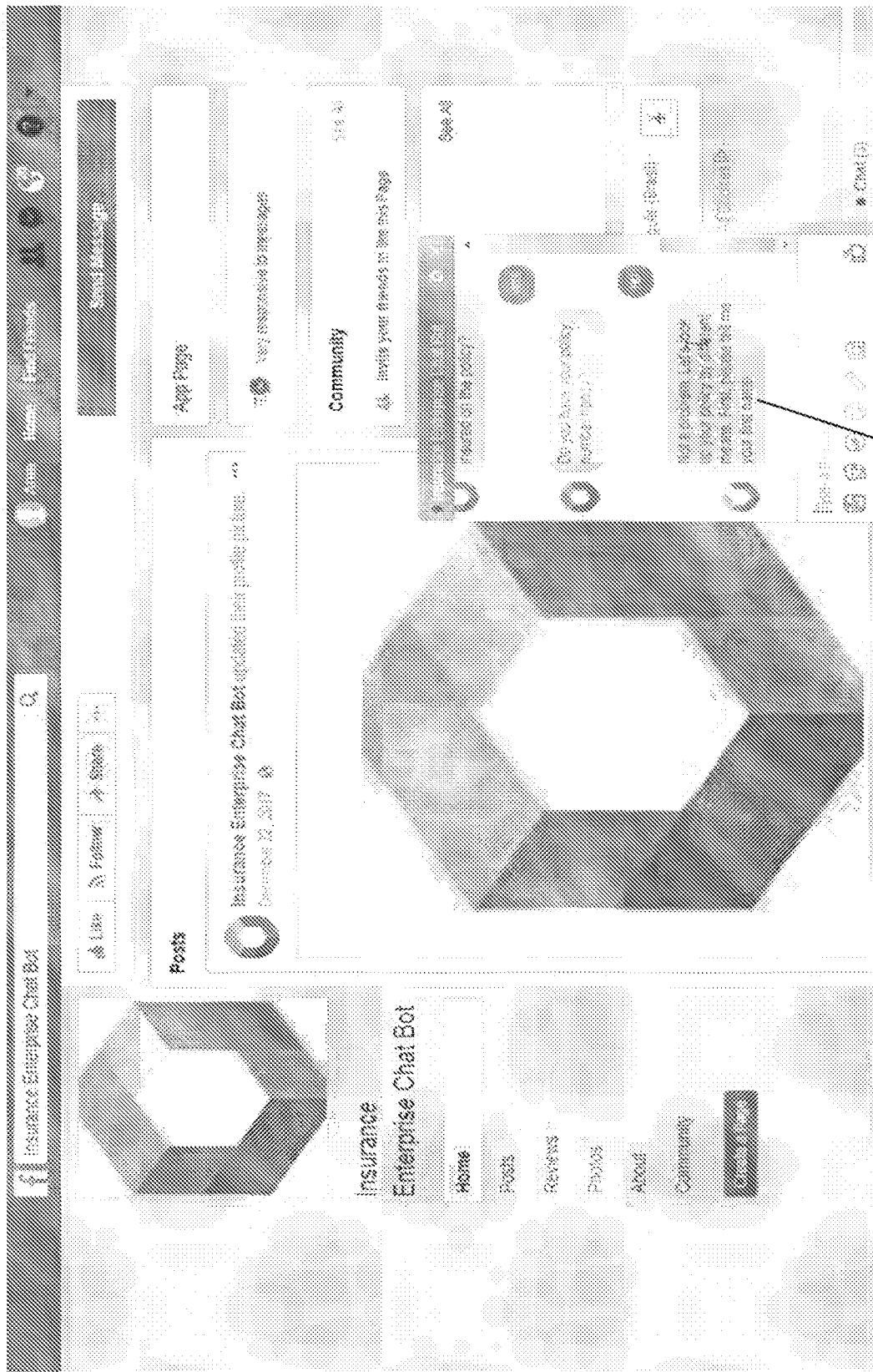

FIGS. 5A-5E show examples of chatbots integrated in a social media channel. FIG. 5A shows an image of a Facebook page of a chatbot system used by insurance companies. The chatbot window 501 may be minimized. FIG. 5B shows another image of the Facebook page of the chatbot system. The chatbot window 511 may be opened by the user. The user may enter "hi." The chatbot may ask the user "Hello, what can I do for you?" The communication may continue in the chatbot window 521 in FIG. 5C. In FIG. 5C, the user may state "I need to report a loss." The chatbot may answer "I can certainly help you with that. Are you the primary insured on the policy?" The user may answer "yes." The chatbot may then ask "do you have your policy number handy?" The communication may continue to the chatbot window 531 in FIG. 5D. In FIG. 5D, the user may answer "no." The chatbot may then state "Not a problem. Let's look up your policy by different means. First, please tell me your first name."

Figure 5E:
Figure 5F:
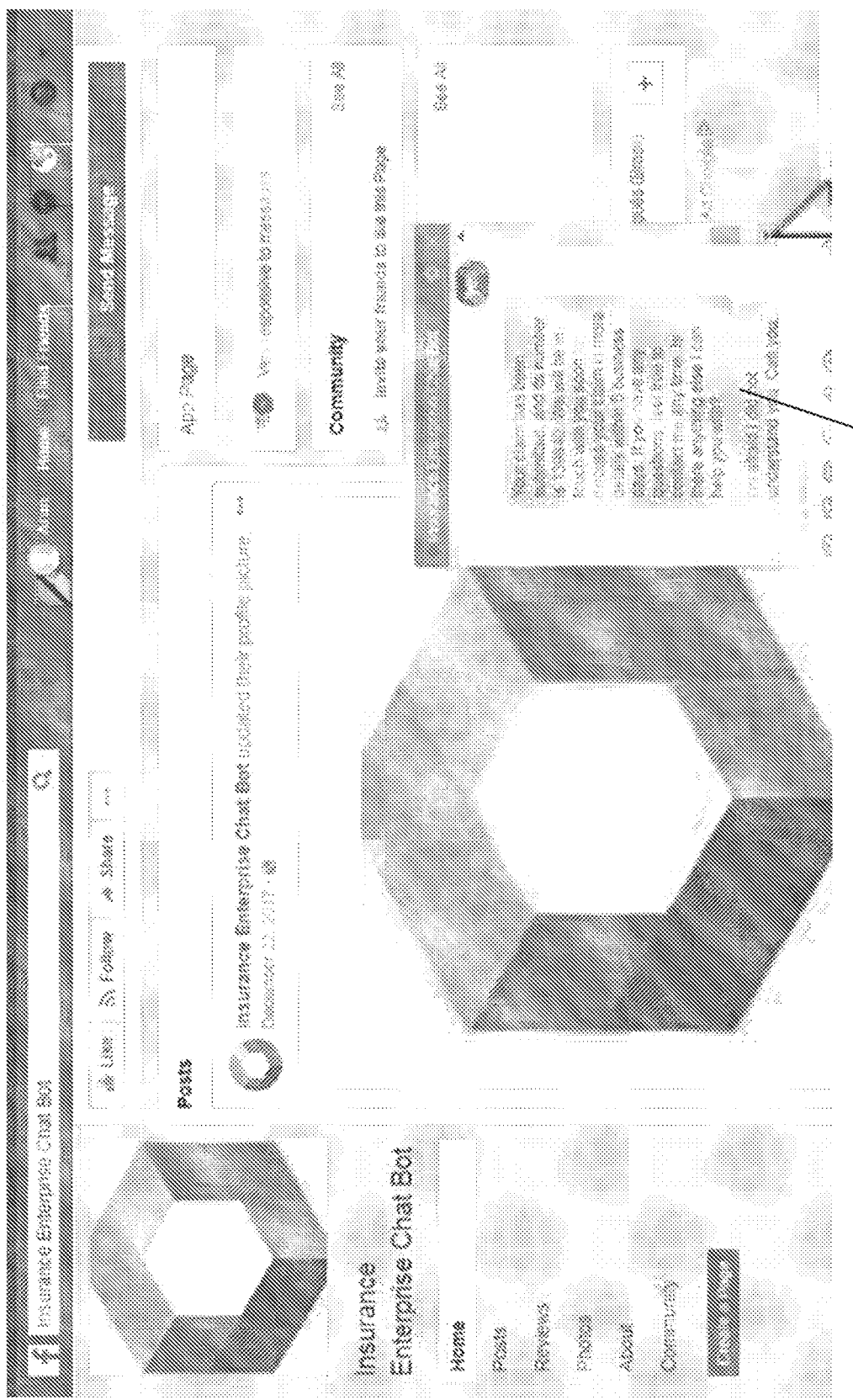

If the communication between the user and the chatbot continues, the communication may show in the chatbot window 541 in FIG. 5E. In FIG. 5E, the chatbot may state "please describe what happened." The user may enter "water heater broke and flooded the garage." The chatbot may ask "What date did the damage occur?" The user may enter "yesterday." The chatbot may then ask "At which approximate time did the damage occur?" After the user provides more details of the damage, the communication may continue in the chatbot window 551 in FIG. 5F. In the FIG. 5F, the chatbot may state "Your claim has been submitted, and its number is 139840. We will be in touch with you soon to discuss your claim in more details within 5 business days. If you have any questions, feel free to contact me at anytime. Is there anything else I can help you with?"

Figure 6:
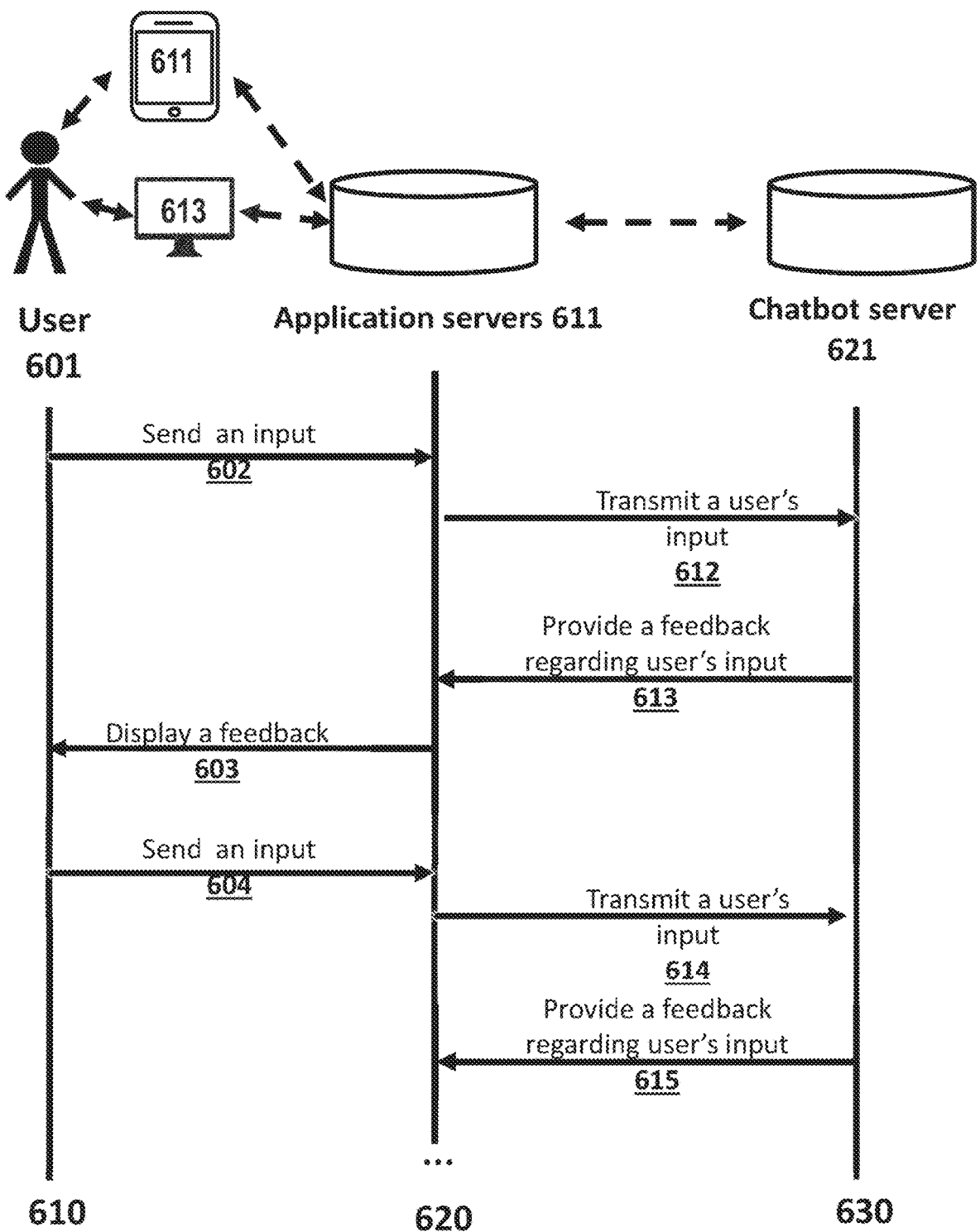
FIG. 6 is an example of a process flow diagram between a user and a chatbot server via an application server.

FIG. 6 is an example of a process flow diagram between a user and a chatbot server via an application server. In FIG. 6, the process(es) carried out by or involving a user 601 is represented by a contact with a vertical line 610, the process(es) carried out by or involving an application server 611 is represented by a contact with a vertical line 620, and the process(es) carried out by or involving a chatbot server 621 is represented by a contact with a vertical line 630. The application server 611 may host one or more communication channels as described elsewhere herein. Although FIG. 6 illustrates a single application server, the disclosure is not limited thereto. For example, the user may be in communication with the chatbot on different channels supported by multiple application servers. In some embodiments, multiple application servers may be in communication with the chatbot server concurrently. In some embodiments, one or more applications may be running on one or more user devices 611, 613. The one or more user devices can be the same as the user devices as described in FIG. 1. A conversation between the user 601 and a chatbot may be carried over multiple user devices and/or multiple applications.

The application servers may also be referred to as communication servers throughout the specification. The application servers and/or the chatbot server can be any other type of network components as described elsewhere herein. For example, the application servers may host software applications that can be deployed as a cloud service, such as in a web services model. The application servers may be a private or commercial (e.g., public) cloud service providers that can provide cloud-computing service that may comprise, for example, an IaaS, PaaS, or SaaS. In another example, the chatbot may be an application runs in a cloud provider environment (e.g., Amazon-AWS, Microsft-Azue or Google-GCE) Alternatively or in addition to, the chatbot may be an application runs in on-premises environment. The application server or the chatbot server may utilize a cloud-computing resource that may be a physical or virtual computing resource (e.g., virtual machine). The cloud-computing resource may include a storage resource (e.g., Storage Area Network (SAN), Network File System (NFS), or Amazon S3®), a network resource (e.g., firewall, load-balancer, or proxy server), an internal private resource, an external private resource, a secure public resource, an infrastructure-as-a-service (IaaS) resource, a platform-as-a-service (PaaS) resource, or a software-as-a-service (SaaS) resource.

In an example conversation between the user and the chatbot, the user 601 may provide 602 an input to the chatbot server 621 through an application running on a user device and the application may be hosted on one of the application servers 611. After receiving the user's input, the application server 611 may transmit 612 the user's input to the chatbot server 621. The chatbot server 621 may perform the following tasks: receiving one or more inputs from the user, comparing the input with the plurality of units in the communication data structure, selecting a unit in the communication data structure based on the comparison between the input and the plurality of units in the communication data structure, producing a communication identity of the user based on the one or more inputs from the user, selecting a unit in the communication data structure based on the communication identity, processing the unit to generate instructions coded in the unit, selecting a communication path based on the instructions generated in the unit, and providing a feedback 613 to the user based on the selected communication path. The chatbot server 621 may provide feedback 613 to the application server 611 regarding the user's input. After receiving the feedback from the chatbot server 621, the application server 611 may display a feedback 603 to the user. In some situations, the same conversation may be continued on a different channel, through a different application, or on a different user device. For example, a user may provide the first user input 602 on a desktop 613, then switch to a portable device 611 (e.g., smart phone) to provide a second user input 604 in order to continue the same conversation with the chatbot 621. In another example, a user may provide a first user input through a first application or a first channel (e.g., Facebook messenger) supported by a first application server, then send a second input 604 through a second application or a second channel (e.g., text message) supported by a second application server. The second application server may transmit the user's input 614 to the chatbot server 621. Similarly, by navigating the communication path, a feedback in response to the second user input may be generated and provided to the user 615 via the second channel.

Computer Control Systems

Figure 7:
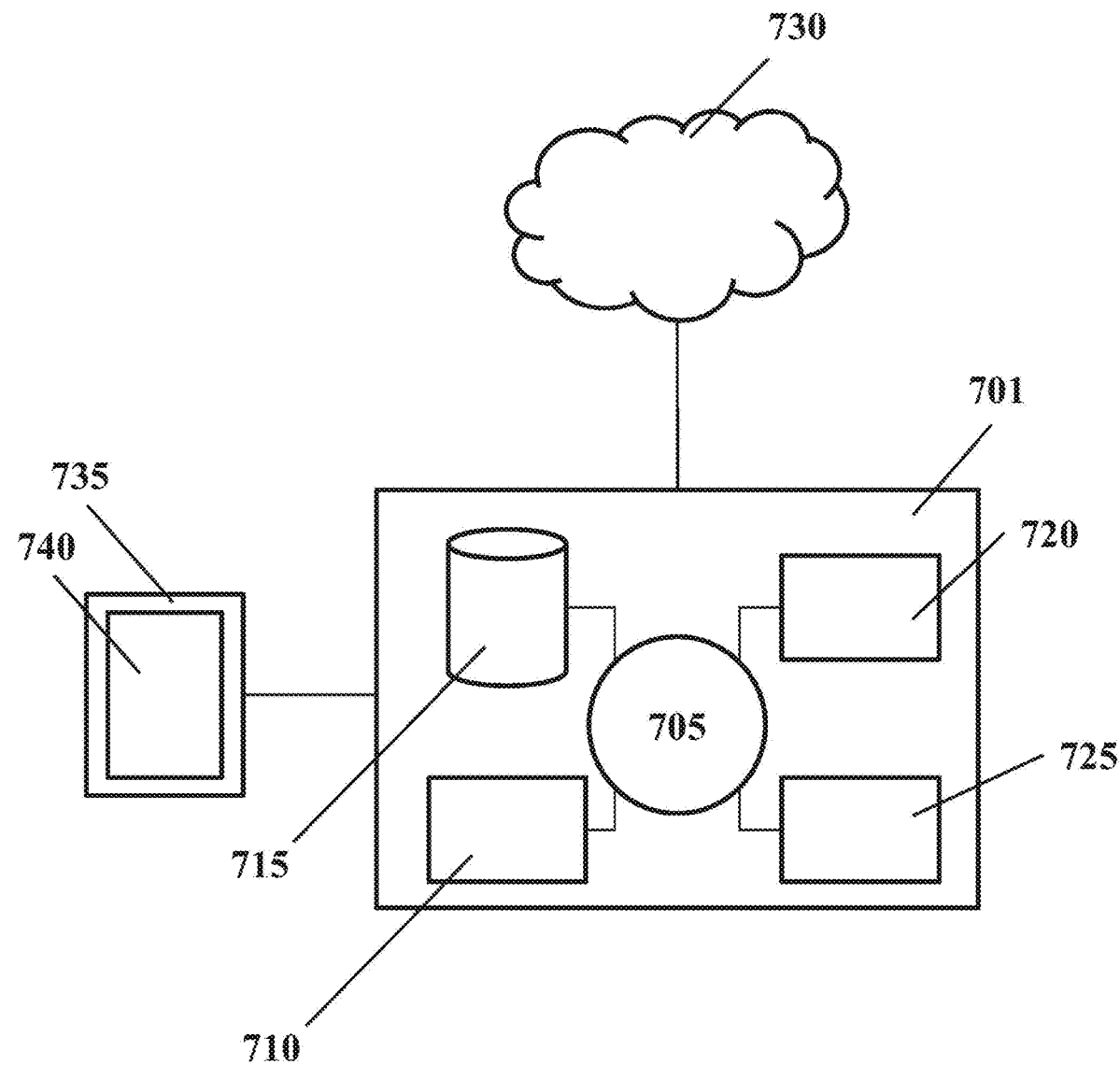
FIG. 7 shows a computer control system that is programmed or otherwise configured to implement methods provided herein.

The present disclosure provides computer control systems that are programmed to implement methods of the disclosure. FIG. 7 shows a computer system 701 that is programmed or otherwise configured to facilitate the communication between a user and a chatbot. The computer system 701 can regulate various aspects of the present disclosure, such as, for example, receiving one or more inputs from the user, comparing the input with the plurality of units in the communication data structure, and producing a communication identity for the user based on the one or more inputs from the user. The computer system 701 can be an electronic device of a user or a computer system that is remotely located with respect to the electronic device. The electronic device can be a mobile electronic device.

The computer system 701 includes a central processing unit (CPU), a graphic processing unit (GPU), or a general-purpose processing unit 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, the feedback regarding a user's input. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, compare the input with the plurality of units in the communication data structure, produce a communication identity for the user based on the one or more inputs from the user, select a unit in the communication data structure based on the communication identity, select a unit in the communication data structure based on the comparison between the input and the plurality of units in the communication data structure, process the unit to generate instructions coded in the unit, select a communication path based on the instructions generated in the unit, and provide a feedback to the user based on the selected communication path.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing automated conversation across multiple communication channels associated with a user, the method comprising:
    selecting a first communication channel from the multiple communication channels;
    receiving, via the first communication channel, a first user input as part of a conversation with a chatbot, the chatbot including a communication data structure including a plurality of communication paths,
        wherein each of the plurality of communication paths comprises a plurality of units, and
        wherein at least one of the plurality of units is coded with instructions to navigate the conversation among different communication paths;
    selecting a communication path based on the first user input, wherein selecting the communication path includes:
        comparing the first user input with the plurality of units in the communication data structure to determine a match;
    generating a first feedback in response to the first user input according to the selected communication path;
    storing the first user input and the first feedback in the communication data structure, wherein each subsequent user input and feedback is stored in the communication data structure;
    terminating the first communication channel;
    receiving, via a second communication channel, a second channel user input as part of the conversation with the chatbot;
    comparing the second channel user input with the plurality of units in the communication data structure to determine a match;
    retrieving, via the communication data structure, the user inputs and feedbacks relating to the first communication channel;
    generating a second feedback in response to the second channel user input according to the selected communication path;
    storing the second channel user input and the second feedback in the communication data structure,
        wherein each subsequent user input and feedback is stored in the communication data structure.

2. The method of claim 1, wherein each communication channel is one of a user interface, communication type, or server.

3. The method of claim 1, wherein the user input is one of text, voice, image, and/or video.

4. The method of claim 1, wherein comparing the first user input or second channel user input with the plurality of units in the communication data structure to determine a match comprises translating the received user input into a format using one or more dictionaries in a communication database, and checking the translated received user input with the plurality of units in the communication data structure until a match is found.

5. The method of claim 1, wherein the plurality of units includes any combination of feedback units, input units, wait units, communication identity analysis units, or universal units.

6. A system for providing automated conversation across multiple channels associated with a user, the system comprising:
    one or more computer processors; and
    a memory having stored therein machine executable instructions, that when executed by the one or more processors, cause the system to:
    select a first communication channel from the multiple communication channels;
    receive, via the first communication channel, a first user input as part of a conversation with a chatbot, the chatbot including a communication data structure including a plurality of communication paths,
        wherein each of the plurality of communication paths comprises a plurality of units, and
        wherein at least one of the plurality of units is coded with instructions to navigate the conversation among different communication paths;
    select a communication path based on the first user input, wherein selecting the communication path includes:
        compare the first user input with the plurality of units in the communication data structure to determine a match;
    generate a first feedback in response to the first user input according to the selected communication path;
    store the first user input and the first feedback in the communication data structure,
        wherein each subsequent user input and feedback is stored in the communication data structure;

receive a termination of the first communication channel;
receive, via a second communication channel, a second channel user input as part of the conversation with the chatbot;
compare the second channel user input with the plurality of units in the communication data structure to determine a match;
retrieve, via the communication data structure, the user inputs and feedbacks relating to the first communication channel;
generate a second feedback in response to the second channel user input according to the selected communication path;
store the second channel user input and the second feedback in the communication data structure,
wherein each subsequent user input and feedback is stored in the communication data structure.

7. The system of claim 6, wherein each communication channel is one of a user interface, communication type, or server.

8. The system of claim 6, wherein the user input is one of text, voice, image, and/or video.

9. The system of claim 6, wherein comparing the first user input or second channel user input with the plurality of units in the communication data structure to determine a match comprises translating the received user input into a format using one or more dictionaries in a communication database, and checking the translated received user input with the plurality of units in the communication data structure until a match is found.

10. The system of claim 6, wherein the plurality of units includes any combination of feedback units, input units, wait units, communication identity analysis units, or universal units.

11. A non-transitory computer-readable storage medium having data stored therein representing software executable by a computer, the software having instructions to:
select a first communication channel from multiple communication channels;
receive, via the first communication channel, a first user input as part of a conversation with a chatbot, the chatbot including a communication data structure including a plurality of communication paths,
wherein each of the plurality of communication paths comprises a plurality of units, and
wherein at least one of the plurality of units is coded with instructions to navigate the conversation among different communication paths;
select a communication path based on the first user input, wherein selecting the communication path includes:
compare the first user input with the plurality of units in the communication data structure to determine a match;
generate a first feedback in response to the first user input according to the selected communication path;
store the first user input and the first feedback in the communication data structure,
wherein each subsequent user input and feedback is stored in the communication data structure;
receive a termination of the first communication channel;
receive, via a second communication channel, a second channel user input as part of the conversation with the chatbot;
compare the second channel user input with the plurality of units in the communication data structure to determine a match;
retrieve, via the communication data structure, the user inputs and feedbacks relating to the first communication channel;
generate a second feedback in response to the second channel user input according to the selected communication path;
store the second channel user input and the second feedback in the communication data structure,
wherein each subsequent user input and feedback is stored in the communication data structure.

12. The non-transitory computer-readable storage medium of claim 11, wherein each communication channel is one of a user interface, communication type, or server.

13. The non-transitory computer-readable storage medium of claim 11, wherein the user input is one of text, voice, image, and/or video.

14. The non-transitory computer-readable storage medium of claim 11, wherein comparing the first user input or second channel user input with the plurality of units in the communication data structure to determine a match comprises translating the received user input into a format using one or more dictionaries in a communication database, and checking the translated received user input with the plurality of units in the communication data structure until a match is found.

15. The non-transitory computer-readable storage medium of claim 11, wherein the plurality of units includes any combination of feedback units, input units, wait units, communication identity analysis units, or universal units.

\* \* \* \* \*